US012633168B2

(12) United States Patent
Ando et al.

(10) Patent No.: US 12,633,168 B2
(45) Date of Patent: May 19, 2026

(54) VEHICLE, METHOD OF CONTROLLING VEHICLE, AND VEHICLE CONTROL INTERFACE BOX

(71) Applicant: TOYOTA JIDOSHA KABUSHIKI KAISHA, Toyota (JP)

(72) Inventors: Eisuke Ando, Nagoya (JP); Mitsuhiro Miura, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 148 days.

(21) Appl. No.: 18/484,260

(22) Filed: Oct. 10, 2023

(65) Prior Publication Data

US 2024/0135754 A1 Apr. 25, 2024
US 2024/0233448 A9 Jul. 11, 2024

(30) Foreign Application Priority Data

Oct. 20, 2022 (JP) ................................. 2022-168235

(51) Int. Cl.
*G07C 5/00* (2006.01)
*B60W 50/14* (2020.01)
*B60W 60/00* (2020.01)

(52) U.S. Cl.
CPC ............. *G07C 5/006* (2013.01); *B60W 50/14* (2013.01); *B60W 60/0016* (2020.02); *B60W 2556/45* (2020.02)

(58) Field of Classification Search
None
See application file for complete search history.

(56) References Cited

U.S. PATENT DOCUMENTS

| | | | |
|---|---|---|---|
| 10,579,070 B1 * | 3/2020 | Konrardy | ............ B60R 25/1001 |
| 10,981,599 B2 * | 4/2021 | Hattori | .................. B60W 50/14 |
| 2013/0253756 A1 | 9/2013 | Matsuno | |
| 2019/0210544 A1 * | 7/2019 | Gowda | ................ B62D 15/027 |
| 2019/0378350 A1 | 12/2019 | DeRouen et al. | |
| 2020/0160624 A1 | 5/2020 | Yamashita et al. | |
| 2020/0377118 A1 | 12/2020 | Ando | |
| 2021/0339762 A1 | 11/2021 | Yee | |
| 2022/0141450 A1 * | 5/2022 | Pieper | .................. G06T 7/0002 |
| | | | 348/148 |

FOREIGN PATENT DOCUMENTS

| | | |
|---|---|---|
| JP | 2000-186349 A | 7/2000 |
| JP | 2013-193612 A | 9/2013 |
| JP | 2018-132015 A | 8/2018 |
| JP | 2020-082918 A | 6/2020 |
| JP | 2020-196333 A | 12/2020 |
| JP | 2021-175635 A | 11/2021 |
| JP | 2022-149043 A | 10/2022 |

* cited by examiner

*Primary Examiner* — Abdhesh K Jha
(74) *Attorney, Agent, or Firm* — Oliff PLC

(57) ABSTRACT

A VCIB performs processing including obtaining various requests from systems (S100), determining whether or not there is a request on the occurrence of an abnormal condition (S102), and transmitting the obtained request to an ADS and carrying out representation control (S104) when it is determined that there is a request on the occurrence of the abnormal condition (YES in S102). The ADS performs processing including carrying out, when the ADS obtains during autonomous driving the request on the occurrence of the abnormal condition, autonomous driving in accordance with the request.

6 Claims, 12 Drawing Sheets

FIG.3

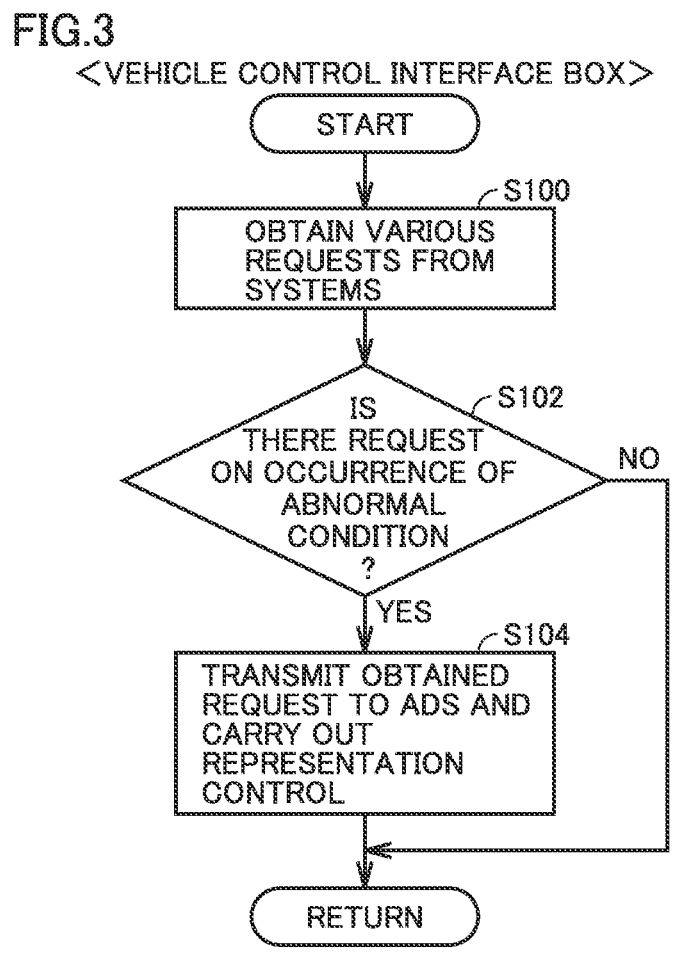

<VEHICLE CONTROL INTERFACE BOX>

START

S100

OBTAIN VARIOUS
REQUESTS FROM
SYSTEMS

S102

IS
THERE REQUEST
ON OCCURRENCE OF
ABNORMAL
CONDITION
?

NO

YES

S104

TRANSMIT OBTAINED
REQUEST TO ADS AND
CARRY OUT
REPRESENTATION
CONTROL

RETURN

FIG.7

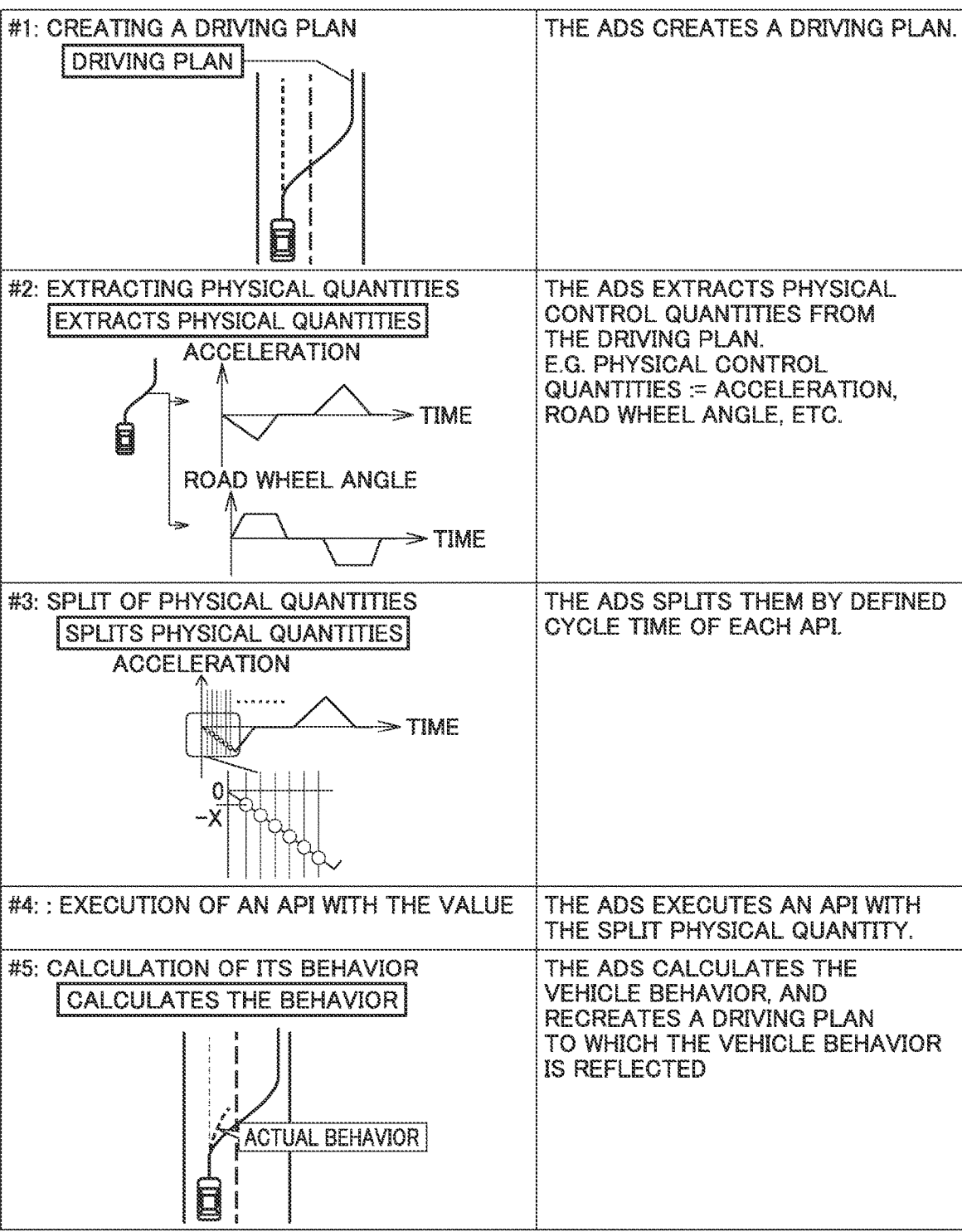

| #1: CREATING A DRIVING PLAN | THE ADS CREATES A DRIVING PLAN. |
|---|---|
| DRIVING PLAN | |
| #2: EXTRACTING PHYSICAL QUANTITIES | THE ADS EXTRACTS PHYSICAL CONTROL QUANTITIES FROM THE DRIVING PLAN. E.G. PHYSICAL CONTROL QUANTITIES := ACCELERATION, ROAD WHEEL ANGLE, ETC. |
| EXTRACTS PHYSICAL QUANTITIES | |
| ACCELERATION | |
| TIME | |
| ROAD WHEEL ANGLE | |
| TIME | |
| #3: SPLIT OF PHYSICAL QUANTITIES | THE ADS SPLITS THEM BY DEFINED CYCLE TIME OF EACH API. |
| SPLITS PHYSICAL QUANTITIES | |
| ACCELERATION | |
| TIME | |
| #4: : EXECUTION OF AN API WITH THE VALUE | THE ADS EXECUTES AN API WITH THE SPLIT PHYSICAL QUANTITY. |
| #5: CALCULATION OF ITS BEHAVIOR | THE ADS CALCULATES THE VEHICLE BEHAVIOR, AND RECREATES A DRIVING PLAN TO WHICH THE VEHICLE BEHAVIOR IS REFLECTED |
| CALCULATES THE BEHAVIOR | |
| ACTUAL BEHAVIOR | |

VEHICLE, METHOD OF CONTROLLING VEHICLE, AND VEHICLE CONTROL INTERFACE BOX

CROSS REFERENCE TO RELATED APPLICATIONS

This nonprovisional application is based on Japanese Patent Application No. 2022-168235 filed with the Japan Patent Office on Oct. 20, 2022, the entire contents of which are hereby incorporated by reference.

BACKGROUND

Field

The present disclosure relates to control of a vehicle capable of autonomous driving.

Description of the Background Art

An autonomous driving system for controlling a vehicle to travel without requiring an operation by a user has recently been developed. For being mountable on an existing vehicle, the autonomous driving system may be provided, for example, separately from the vehicle with an interface being interposed.

For example, Japanese Patent Laying-Open No. 2018-132015 discloses as such an autonomous driving system, a technique that allows addition of an autonomous driving function without great modification to an existing vehicle platform, by providing an electronic control unit (ECU) that manages motive power of a vehicle and an ECU for autonomous driving independently of each other.

SUMMARY

When a failure occurs in such a vehicle and maintenance of the vehicle is demanded, early performance of maintenance is demanded.

An object of the present disclosure is to provide a vehicle on which an autonomous driving system is mountable, the vehicle allowing early performance of maintenance when maintenance of the vehicle is demanded, a method of controlling a vehicle, and a vehicle control interface box.

A vehicle according to one aspect of the present disclosure includes an autonomous driving system and a vehicle platform on which the autonomous driving system is mounted. The vehicle platform includes a base vehicle that carries out vehicle control in accordance with a command from the autonomous driving system and a vehicle control interface box that interfaces between the base vehicle and the autonomous driving system. The base vehicle includes a notification apparatus that gives information to a driver in a compartment. When a malfunction occurs in a device in the base vehicle, the vehicle control interface box outputs to the autonomous driving system, at least one of a stop request, an engine off request, a request for change to a parking position, and a request or a notification of maintenance and gives information corresponding to the outputted request or notification by the notification apparatus.

Thus, when a malfunction occurs, a request or a notification is outputted to the autonomous driving system and information corresponding to the request or the notification is given with the use of the notification apparatus. Therefore, the autonomous driving system can perform an operation for performance of maintenance and the user can recognize the maintenance to be performed. Consequently, maintenance can be performed early.

In one embodiment, the request or the notification of maintenance includes at least one of a request for movement to a dealer of the vehicle, a request for a maintenance service, a request for reservation of the maintenance service, and a notification of a time limit of the maintenance.

Thus, when a malfunction occurs in a device in the base vehicle, various requests or notifications are outputted to the autonomous driving system so that the autonomous driving system can perform an operation for performance of maintenance.

In one further embodiment, the information includes information on at least one of a stop instruction, an instruction to check a manual, an instruction to change to a parking position, an instruction to check a tire of the vehicle, an instruction to turn off power of the vehicle, an instruction to move to a dealer of the vehicle, an instruction to refrain from change to a neutral position, an instruction to remove debris attached to the vehicle, an instruction to clean various sensors, an instruction to operate a brake pedal of the vehicle, and an instruction for replenishment or replacement of various types of hydraulic fluid.

Thus, various types of information are given as the information corresponding to the request or the notification with the use of the notification apparatus. Since the user can thus recognize the maintenance to be performed, maintenance can be performed early.

In one further embodiment, the malfunction of the device in the base vehicle includes at least one of a malfunction of a brake system, a malfunction of a drive system, a malfunction of a power supply system, a malfunction of an operation apparatus, a malfunction of an air bag system, a malfunction of a power steering system, a malfunction of various sensors, a malfunction of a lighting apparatus, and a malfunction of a device that is activated at the time of collision.

Thus, on the occurrence of various malfunctions, a request or a notification corresponding to a malfunction is outputted to the autonomous driving system and information corresponding to the request or the notification is given. Therefore, the autonomous driving system can perform an operation for performance of maintenance and the user can recognize the maintenance to be performed.

A method of controlling a vehicle according to another aspect of the present disclosure is a method of controlling a vehicle including a vehicle platform on which an autonomous driving system is mounted. The vehicle platform includes a vehicle control interface box that interfaces between a base vehicle and the autonomous driving system. The base vehicle includes a notification apparatus that gives information to a driver in a compartment. The method includes carrying out vehicle control in accordance with a command from the autonomous driving system, outputting to the autonomous driving system, when a malfunction occurs in a device in the base vehicle, at least one of a stop request, an engine off request, a request for change to a parking position, and a request or a notification of maintenance, and giving information corresponding to the outputted request or notification by the notification apparatus.

A vehicle control interface box according to yet another aspect of the present disclosure is a vehicle control interface box that interfaces between an autonomous driving system and a base vehicle. The base vehicle carries out vehicle control in accordance with a command from the autonomous driving system. The base vehicle and the vehicle control interface box implement a vehicle platform provided in the vehicle together with the autonomous driving system. The base vehicle includes a notification apparatus that gives information to a driver in a compartment. When a malfunction occurs in a device in the base vehicle, the vehicle control interface box outputs to the autonomous driving system, at least one of a stop request, an engine off request, a request for change to a parking position, and a request or a notification of maintenance and gives information corresponding to the outputted request or notification by the notification apparatus.

The foregoing and other objects, features, aspects and advantages of the present disclosure will become more apparent from the following detailed description of the present disclosure when taken in conjunction with the accompanying drawings.

BRIEF DESCRIPTION OF THE DRAWINGS

FIG. 3 is a flowchart showing exemplary processing performed in the VCIB.

FIG. 7 is a diagram showing a typical workflow in the ADS.

DESCRIPTION OF THE PREFERRED EMBODIMENTS

Figure 1:
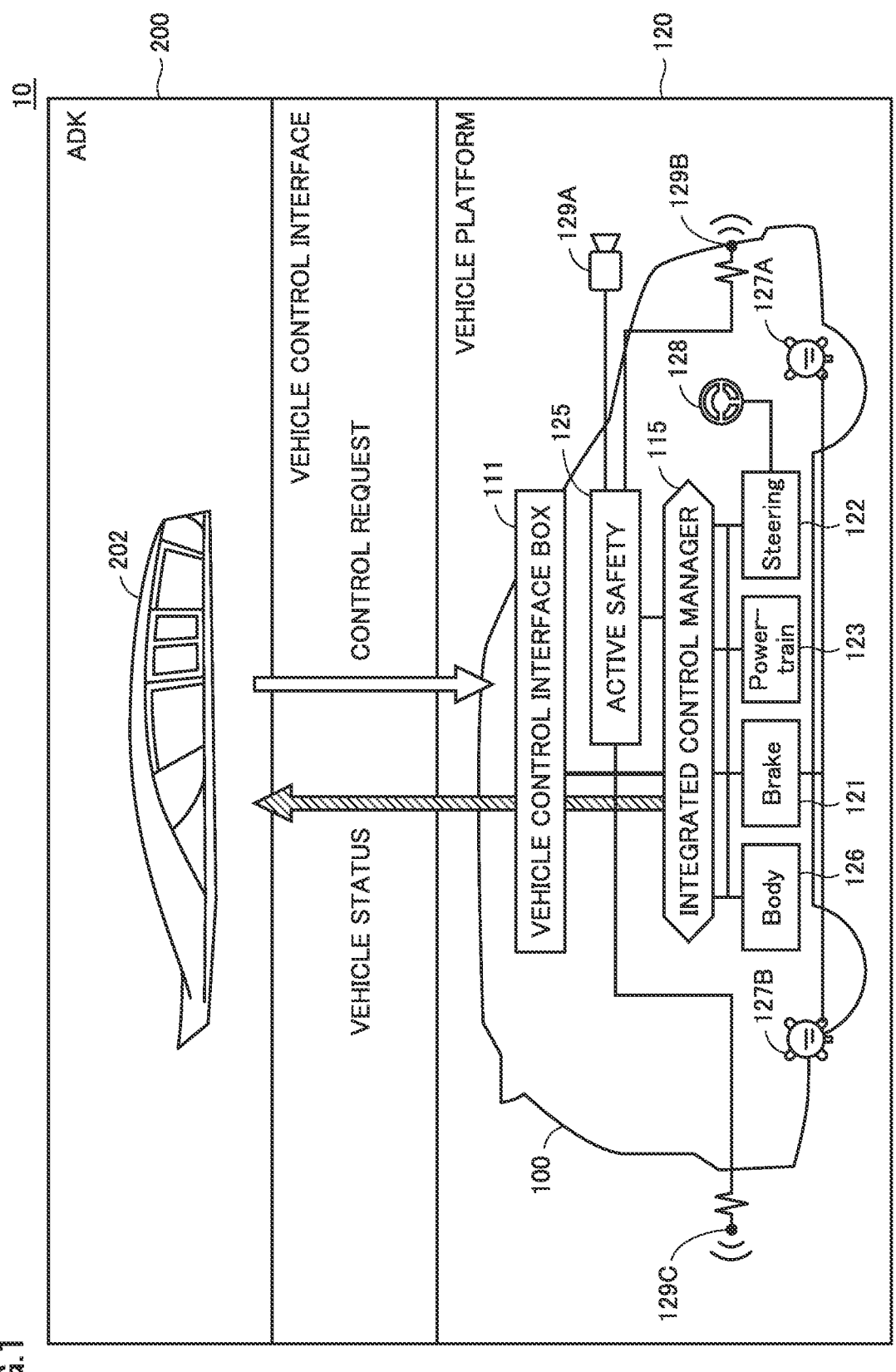
FIG. 1 is a diagram showing overview of a vehicle according to an embodiment of the present disclosure.

An embodiment of the present disclosure will be described below in detail with reference to the drawings. The same or corresponding elements in the drawings have the same reference characters allotted and description thereof will not be repeated.

FIG. 1 is a diagram showing overview of a vehicle 10 according to an embodiment of the present disclosure. Referring to FIG. 1, vehicle 10 includes an autonomous driving kit (which is denoted as "ADK" below) 200 and a vehicle platform (which is denoted as "VP" below) 120. ADK 200 and VP 120 are configured to communicate with each other through a vehicle control interface.

Vehicle 10 can carry out autonomous driving in accordance with control requests (commands) from ADK 200 attached to VP 120. Though FIG. 1 shows VP 120 and ADK 200 at positions distant from each other, ADK 200 is actually attached to a rooftop or the like of a base vehicle 100 which will be described later. ADK 200 can also be removed from VP 120. While ADK 200 is not attached, VP 120 can travel by driving by a user. In this case, VP 120 carries out travel control (travel control in accordance with an operation by a user) in a manual mode.

ADK 200 includes an autonomous driving system (which is denoted as "ADS" below) 202 for autonomous driving of vehicle 10. For example, ADS 202 creates a driving plan of vehicle 10 and outputs various commands (control requests) for travel of vehicle 10 in accordance with the created driving plan to VP 120 in accordance with an application program interface (API) defined for each command. ADS 202 receives various signals indicating statuses (vehicle statuses) of VP 120 from VP 120 in accordance with the API defined for each signal and has the received vehicle status reflected on creation of the driving plan. A detailed configuration of ADS 202 will be described later.

VP 120 includes base vehicle 100 and a vehicle control interface box (which is denoted as "VCIB" below) 111 that implements a vehicle control interface provided within base vehicle 100.

VCIB 111 can communicate with ADK 200 over a controller area network (CAN). VCIB 111 receives various commands from ADK 200 or outputs a status of VP 120 to ADK 200 by executing a prescribed API defined for each communicated signal. When VCIB 111 receives a control request from ADK 202, it outputs a control command corresponding to the control request to a system corresponding to the control command through an integrated control manager 115. VCIB 111 obtains various types of information on base vehicle 100 from various systems through integrated control manager 115 and outputs the status of base vehicle 100 as the vehicle status to ADK 200.

VP 120 includes various systems and various sensors for controlling base vehicle 100. As VP 120 carries out various types of vehicle control in accordance with a control request from ADK 200 (more specifically, ADS 202), autonomous driving of vehicle 10 is carried out. VP 120 includes, for example, a brake system 121, a steering system 122, a powertrain system 123, an active safety system 125, and a body system 126.

Brake system 121 is configured to control a plurality of braking apparatuses provided in wheels of base vehicle 100. The braking apparatus includes, for example, a disc brake system that is operated with a hydraulic pressure regulated by an actuator.

For example, wheel speed sensors 127A and 127B are connected to brake system 121. Wheel speed sensor 127A is provided, for example, in a front wheel of base vehicle 100 and detects a rotation speed of the front wheel. Wheel speed sensor 127A outputs the rotation speed of the front wheel to brake system 121. Wheel speed sensor 127B is provided, for example, in a rear wheel of base vehicle 100 and detects a rotation speed of the rear wheel. Wheel speed sensor 127B outputs the rotation speed of the rear wheel to brake system 121. Wheel speed sensors 127A and 127B each provide a pulsed signal as an output value (a pulse value). The rotation speed can be calculated based on the number of pulses in the pulsed signal. Brake system 121 outputs the rotation speed of each wheel to VCIB 111 as one of pieces of information included in a vehicle status.

Brake system 121 generates a braking command to a braking apparatus in accordance with a prescribed control request outputted from ADK 200 through VCIB 111 and integrated control manager 115 and controls the braking apparatus based on the generated braking command.

Steering system 122 is configured to control a steering angle of a steering wheel of vehicle 10 with a steering apparatus. The steering apparatus includes, for example, rack-and-pinion electric power steering (EPS) that allows adjustment of a steering angle by an actuator.

A pinion angle sensor 128 is connected to steering system 122. Pinion angle sensor 128 detects an angle of rotation of a pinion gear (a pinion angle) coupled to a rotation shaft of the actuator included in the steering apparatus. Pinion angle sensor 128 provides a detected pinion angle to steering system 122. Steering system 122 provides the pinion angle as one of pieces of information included in the vehicle status to VCIB 111.

Steering system 122 generates a steering command to the steering apparatus in accordance with a prescribed control request outputted from ADK 200 through VCIB 111 and integrated control manager 115. Steering system 122 controls the steering apparatus based on the generated steering command.

Powertrain system 123 controls an electric parking brake (EPB) provided in at least one of a plurality of wheels provided in vehicle 10, a P-Lock apparatus provided in a transmission of vehicle 10, a shift apparatus configured to select any shift range from among a plurality of shift ranges, and a drive source of vehicle 10. Detailed description will be given later.

Active safety system 125 detects an obstacle (an obstacle or a human) in front or in the rear with the use of a camera 129A and radar sensors 129B and 129C. When active safety system 125 determines that there is possibility of collision based on a distance to the obstacle or the like and a direction of movement of vehicle 10, it outputs a braking command to brake system 121 through integrated control manager 115 so as to increase braking force.

Body system 126 is configured to control, for example, components such as a direction indicator, a horn, or a wiper, depending on a status of travel or an environment around vehicle 10. Body system 126 controls the above-described component in accordance with a prescribed control request outputted from ADK 200 through VCIB 111 and integrated control manager 115.

Vehicle 10 may be adopted as one of constituent elements of a mobility as a service (MaaS) system. The MaaS system further includes, for example, a data server, a mobility service platform (which is denoted as "MSPF" below), and autonomous driving related mobility services (none of which is shown), in addition to vehicle 10.

Vehicle 10 further includes a data communication module (DCM) (not shown) as a communication interface (I/F) to wirelessly communicate with the data server described above. The DCM outputs various types of vehicle information such as a speed, a position, or an autonomous driving state to the data server. The DCM receives from the autonomous driving related mobility services through the MSPF and the data server, various types of data for management of travel of an autonomous driving vehicle including vehicle 10 in the mobility services.

The MSPF is an integrated platform to which various mobility services are connected. In addition to autonomous driving related mobility services, not-shown various mobility services (for example, various mobility services provided by a ride-share company, a car-sharing company, an insurance company, a rent-a-car company, and a taxi company) are connected to the MSPF. Various mobility services including mobility services can use various functions provided by the MSPF by using APIs published on the MSPF, depending on service contents.

The autonomous driving related mobility services provide mobility services using an autonomous driving vehicle including vehicle 10. The mobility services can obtain, for example, operation control data of vehicle 10 that communicates with the data server or information stored in the data server from the MSPF by using the APIs published on the MSPF. The mobility services transmit, for example, data for managing an autonomous driving vehicle including vehicle 10 to the MSPF by using the API.

The MSPF publishes APIs for using various types of data on vehicle statuses and vehicle control necessary for development of the ADS. An ADS provider can use as the APIs, the data on the vehicle statuses and vehicle control necessary for development of the ADS stored in the data server.

Figure 2:
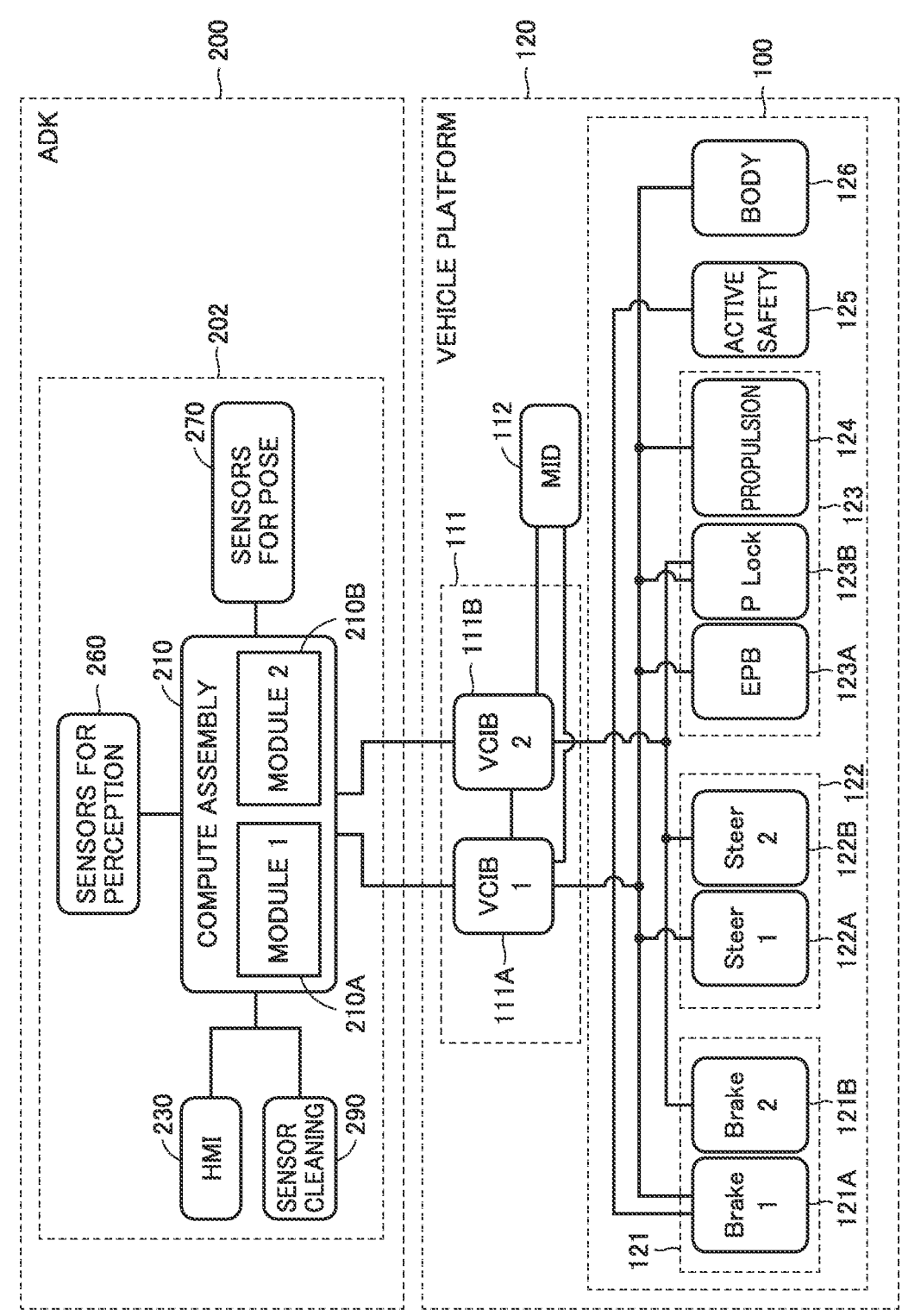
FIG. 2 is a diagram illustrating in detail, a configuration of an ADS, a VCIB, and a VP.

FIG. 2 is a diagram for illustrating in detail, a configuration of ADS 202, VCIB 111, and VP 120. As shown in FIG. 2, ADS 202 includes a compute assembly 210, a human machine interface (HMI) 230, sensors for perception 260, sensors for pose 270, and a sensor cleaning 290.

During autonomous driving of the vehicle, compute assembly 210 obtains information indicating an environment around the vehicle and information indicating a pose, a behavior, and a position of the vehicle from various sensors which will be described later, and obtains a vehicle status from VP 120 which will be described later through VCIB 111 and sets a next operation (acceleration, deceleration, or turning) of vehicle 10. Compute assembly 210 outputs various commands for realizing a set next operation of the vehicle to VCIB 111. Compute assembly 210 includes communication modules 210A and 210B. Communication modules 210A and 210B are configured to communicate with VCIB 111.

HMI 230 presents information to a user and accepts an operation by the user during autonomous driving, during driving requiring an operation by the user, or at the time of transition between autonomous driving and driving requiring an operation by the user. HMI 230 is constructed to be connected to an input and output apparatus such as a touch panel display, a display apparatus, and an operation apparatus provided in base vehicle 100.

Sensors for perception 260 include sensors that perceive an environment around vehicle 10 and include, for example, at least one of laser imaging detection and ranging (LIDAR), a millimeter-wave radar, and a camera.

The LIDAR refers to a distance measurement apparatus that measures a distance based on a time period from emission of pulsed laser beams (infrared rays) until return of the laser beams reflected by an object. The millimeter-wave radar is a distance measurement apparatus that measures a distance or a direction to an object by emitting radio waves short in wavelength to the object and detecting radio waves that return from the object. The camera is arranged, for example, on a rear side of a room mirror in a compartment and used for shooting an image of the front of the vehicle. Information obtained by sensors for perception 260 is outputted to compute assembly 210. As a result of image processing by artificial intelligence (AI) or an image processing processor onto images or video images shot by the camera, another vehicle, an obstacle, or a human in front of the vehicle can be recognized.

Sensors for pose 270 include sensors that detect a pose, a behavior, or a position of the vehicle, and include, for example, an inertial measurement unit (IMU) or a global positioning system (GPS).

The IMU detects, for example, an acceleration in a front-rear direction, a lateral direction, and a vertical direction of the vehicle and an angular speed in a roll direction, a pitch direction, and a yaw direction of the vehicle. The GPS detects a position of vehicle 10 based on information received from a plurality of GPS satellites that orbit the Earth. Information obtained by sensors for pose 270 is outputted to compute assembly 210.

Sensor cleaning 290 is configured to remove soiling attached to various sensors during traveling of the vehicle. Sensor cleaning 290 removes soiling attached to a lens of the camera or a portion from which laser beams or radio waves are emitted, for example, with a cleaning solution or a wiper.

VCIB 111 includes a VCIB 111A and a VCIB 111B. Each of VCIB s 111A and 111B contains a central processing unit (CPU) and a memory (for example, a read only memory (ROM) and a random access memory (RAM)), neither of which is shown. Though VCIB 111A is equivalent in function to VCIB 111B, it is partially different in a plurality of systems connected to the VCIBs that make up VP 120.

VCIBs 111A and 111B are communicatively connected to communication modules 210A and 210B of compute assembly 210, respectively. VCIB 111A and VCIB 111B are communicatively connected to each other.

VCIBs 111A and 111B each relay various commands corresponding to control requests from ADS 202 and output them as control commands to a corresponding system of VP 120. More specifically, each of VCIB 111A and VCIB 111B uses various commands provided from ADS 202 based on information (for example, an API) such as a program stored in the memory to generate a control command to be used for control of a corresponding system of VP 120 and outputs the control command to the corresponding system. VCIBs 111A and 111B each relay vehicle information provided from each system of VP 120 and provide the vehicle information as a vehicle status to ADS 202. The information indicating the vehicle status may be information identical to the vehicle information or may be information extracted from the vehicle information to be used for processing performed by ADS 202.

As VCIBs 111A and 111B equivalent in function relating to an operation of at least one of (for example, braking or steering) systems are provided, control systems between ADS 202 and VP 120 are redundant. Thus, when some kind of failure occurs in a part of the system, the function (turning or stopping) of VP 120 can be maintained by switching between the control systems as appropriate or disconnection of a control system where failure has occurred.

Brake system 121 includes brake systems 121A and 121B. Steering system 122 includes steering systems 122A and 122B. Powertrain system 123 includes an EPB system 123A, a P-Lock system 123B, and a propulsion system 124.

VCIB 111A is communicatively connected to brake system 121A, steering system 122A, EPB system 123A, P-Lock system 123B, propulsion system 124, and body system 126 of the plurality of systems of VP 120 through a communication bus.

VCIB 111B is communicatively connected to brake system 121B, steering system 122B, and P-Lock 123B of the plurality of systems of VP 120 through a communication bus.

A multi information display (MID) 112 is connected to VCIB 111. MID 112 is a display apparatus that gives various types of information such as an odometer, a trip meter, outdoor temperature representation, or a status of maintenance and a request, a notification, or the like to a user. MID 112 is provided, for example, at a position where it can be viewed from the user who sits in the compartment (for example, around the steering wheel). MID 112 shows with an image or the like, various types of information including text information in accordance with a representation command from VCIB 111 (specifically, at least one of VCIB 111A and VCIB 111B). MID 112 may show various types of information, for example, in accordance with a representation command from ADS 202 via VCIB 111.

Brake systems 121A and 121B are configured to control a plurality of braking apparatuses provided in wheels of the vehicle. Brake system 121A may be equivalent in function to brake system 121B, or one of them may be configured to independently control braking force of each wheel during travel of the vehicle and the other thereof may be configured to control braking force such that equal braking force is generated in the wheels during travel of the vehicle.

Brake systems 121A and 121B generate braking commands to the braking apparatuses in accordance with a control request outputted from ADS 202 through VCIB 111A and VCIB 111B, respectively. For example, brake systems 121A and 121B control the braking apparatuses based on a braking command generated in one of the brake systems, and when a failure occurs in that brake system, the braking apparatuses are controlled based on a braking command generated in the other brake system.

Steering systems 122A and 122B are configured to control a steering angle of a steering wheel of vehicle 10 with a steering apparatus. Steering system 122A is similar in function to steering system 122B.

Steering systems 122A and 122B generate steering commands to the steering apparatus in accordance with a control request outputted from ADS 202 through VCIB 111A and VCIB 111B, respectively. For example, steering systems 122A and 122B control the steering apparatus based on the steering command generated in one of the steering systems, and when a failure occurs in that steering system, the steering apparatus is controlled based on a steering command generated in the other steering system.

EPB system 123A is configured to control the EPB. The EPB fixes a wheel by an operation of an actuator. The EPB, for example, activates with an actuator, a drum brake for a parking brake provided in at least one of a plurality of wheels provided in vehicle 10 to fix the wheel, or activates a braking apparatus to fix a wheel with an actuator capable of regulating a hydraulic pressure to be supplied to the braking apparatus separately from brake systems 121A and 121B.

EPB system 123A controls the EPB in accordance with a control request outputted from ADS 202 through VCIB 111A.

P-Lock system 123B is configured to control a P-Lock apparatus. The P-Lock apparatus fits a protrusion provided at a tip end of a parking lock pawl, a position of which is adjusted by an actuator, into a tooth of a gear (locking gear) provided as being coupled to a rotational element in the transmission of vehicle 10. Rotation of an output shaft of the transmission is thus fixed so that fixing of rotation of the wheel (which is also referred to as "fixing of wheels" below) of a drive wheel is carried out.

P-Lock system 123B controls the P-Lock apparatus in accordance with a control request provided from ADS 202 through VCIB 111A. For example, when the control request provided from ADS 202 through VCIB 111A includes a control request to set the shift range to a parking range (which is denoted as a P range below), P-Lock system 123B activates the P-Lock apparatus, and when the control request includes a control request to set the shift range to a shift range other than the P range, it deactivates the P-Lock apparatus.

Propulsion system 124 is configured to switch a shift range with the use of a shift apparatus and to control driving force of vehicle 10 in a direction of movement of vehicle 10 that is generated from a drive source. Switchable shift ranges include, for example, the P range, a neutral range (which is denoted as an N range below), a forward travel range (which is denoted as a D range below), and a rearward travel range (which is denoted as an R range below). The drive source includes, for example, a motor generator and an engine.

Propulsion system 124 controls the shift apparatus and the drive source in accordance with a control request provided from ADS 202 through VCIB 111A. For example, when a control request provided from ADS 202 through VCIB 111A includes a control request to set the shift range to the P range, propulsion system 124 controls the shift apparatus to set the shift range to the P range.

Active safety system 125 is communicatively connected to brake system 121A. As described above, active safety system 125 detects an obstacle (an obstacle or a human) in front by using camera 129A and radar sensor 129B, and when it determines that there is possibility of collision based on a distance to the obstacle, it outputs a braking command to brake system 121A so as to increase braking force. Active safety system 125 includes, for example, an SRS air bag system and a pre crash safety (PCS) system (neither of which is shown). A supplemental restraint system (SRS) bag system performs a function to expand the SRS air bag, for example, when a G sensor or the like detects variation in acceleration corresponding to collision in vehicle 10. The PCS system notifies the driver or the passenger of possibility of collision, has a seat belt wound up, or holds an operation of the brake or the steering wheel, for example, when another car comes toward vehicle 10 from the front and it determines possibility of collision against that car as being high based on a speed relative to that car or a relative distance therefrom.

Body system 126 controls components such as a direction indicator, a horn, or a wiper in accordance with a control request provided from ADS 202 through VCIB 111A.

An operation apparatus manually operable by a user for the braking apparatus, the steering apparatus, the EPB, the P-Lock apparatus, the shift apparatus, and the drive source described above may separately be provided.

Various commands corresponding to control requests provided from ADS 202 to VCIB 111 include a propulsion direction command requesting switching of the shift range, an immobilization command requesting activation or deactivation of the EPB and the P-Lock apparatus, an acceleration command requesting acceleration or deceleration of vehicle 10, a wheel steer angle command requesting a wheel steer angle of a steering wheel, an autonomization command requesting switching of an autonomous state between an autonomous mode and a manual mode, and a standstill command requesting keeping on stationary or keeping off stationary of the vehicle.

For example, when an autonomous mode is selected as the autonomous state by an operation by the user onto HMI 230 in vehicle 10 configured as above, autonomous driving is carried out. During autonomous driving, ADS 202 initially creates a driving plan as described above. Examples of the driving plan include a plurality of plans relating to operations of vehicle 10 such as a plan to continue straight travel, a plan to turn left or right at a prescribed intersection on a predetermined travel path, and a plan to change a travel lane to a lane different from the lane where the vehicle currently travels.

ADS 202 extracts a controllable physical quantity (for example, an acceleration or a deceleration, and a wheel steer angle) necessary for operations of vehicle 10 in accordance with the created driving plan. ADS 202 splits the physical quantity for each execution cycle time of the API. ADS 202 executes the API with the use of the resultant physical quantity and outputs various commands to VCIB 111. Furthermore, ADS 202 obtains a vehicle status (for example, an actual direction of movement of vehicle 10 and a state of fixation of the vehicle or failure information) from VP 120 and creates again the driving plan on which the obtained vehicle status is reflected. ADS 202 thus allows autonomous driving of vehicle 10. When a failure occurs in such a vehicle 10 and maintenance of vehicle 10 is demanded, early performance of the maintenance is demanded.

In the present embodiment, when an abnormal condition (including a malfunction) occurs in a device in base vehicle 100, VCIB 111 outputs to ADS 202, at least one of a stop request, an engine off request to stop activation of the drive source, a request for change to the P position, and a request or a notification of maintenance and gives information corresponding to the outputted request or notification with the use of MID 112.

Thus, when an abnormal condition occurs in a device in base vehicle 100, a request or a notification is outputted to ADS 202 and information corresponding to the request or the notification is given with the use of MID 112. Therefore, ADS 202 can perform an operation for performance of maintenance and the user can recognize the maintenance to be performed. Consequently, maintenance can be performed early.

Processing performed by VCIB 111 (more specifically, at least one of VCIB 111A and VCIB 111B) will be described below with reference to FIG. 3. FIG. 3 is a flowchart showing exemplary processing performed in VCIB 111. VCIB 111 repeatedly performs processing as below, for example, every API execution cycle time.

In step (the step being denoted as S below) 100, VCIB 111 obtains various requests or the like from the systems. The systems output various requests or various notifications in accordance with a status of vehicle 10. The systems include, for example, at least one of a hybrid system (in which an engine and a motor generator are mounted as drive sources), an engine system (in which an engine is mounted as a drive source), a hybrid battery system (in a case of a hybrid electric vehicle), and an accelerator system. These systems are assumed as being included in propulsion system 124 described above.

Each of the systems determines that an abnormal condition has occurred in a component thereof, for example, when timing to replace any consumable in the system or timing to clean a device or a component comes or when a normal function is not performed due to deterioration over time or wear of a device or component in the system, and outputs a request or the like relating to maintenance for replacement, cleaning, or repair.

For example, with timing of previous replacement or cleaning of the consumable being defined as start timing, when a predetermined period has elapsed since then, when the vehicle has traveled a predetermined distance since the start timing, or when a predetermined period during which the vehicle is active has elapsed since the start timing, each of the systems outputs a request or the like relating to maintenance.

The request or the like relating to maintenance includes, for example, at least one of a movement request that requests movement of vehicle 10 to the dealer that owns a maintenance factory for performance of maintenance of vehicle 10, a performance request that requests performance of maintenance, a reservation request that requests a reservation of maintenance, and a notification of timing of maintenance such as timing of replacement or timing of cleaning.

The consumable includes, for example, at least one of various types of hydraulic fluid such as engine oil (when an engine is mounted as a drive source), differential oil, or automatic transmission fluid (ATF), a consumable used for a drive source such as an oil filter corresponding to the various types of hydraulic fluid, a consumable used for a device in the compartment such as a filter of an air-conditioner, a consumable that is made from an elastic member such as rubber and deteriorates over time, such as a bush or a boot provided in a suspension, wiper rubber, or a tire, and a consumable that is exhausted as a result of continued travel of vehicle 10, such as a brake pad.

Alternatively, for example, when an abnormal condition occurs in any device or component in each of the systems, the system outputs a request or the like relating to a limp home operation for evacuation of vehicle 10. The request or the like relating to the limp home operation includes, for example, at least one of a stop request that requests a standstill, an engine off request that requests deactivation of the drive source, a shift request that requests change of the shift range to the parking position, and a brake request that requests pressing down of the brake pedal.

In an example where the engine is mounted as the drive source, propulsion system 124 determines that the abnormal condition has occurred in the engine, for example, when a hydraulic pressure of the engine or an amount of oil in the engine becomes lower than a threshold value or when a temperature of oil or water exceeds a threshold value.

Alternatively, in an example where the motor generator is mounted as the drive source, propulsion system 124 determines that the abnormal condition has occurred in the motor generator, for example, when a temperature of a medium (hydraulic fluid or coolant) that lubricates or cools the motor exceeds a threshold value. Furthermore, propulsion system 124 determines that the abnormal condition has occurred in a function to cool a drive battery, for example, when a temperature of a medium (cooling air) that cools the drive battery where electric power to be supplied to the motor generator is stored exceeds a threshold value. Alternatively, propulsion system 124 determines that the abnormal condition has occurred in a function of the drive battery when a current or a voltage in the drive battery exceeds a threshold value.

Alternatively, propulsion system 124 determines that the abnormal condition has occurred in a sensor that detects an amount of pressing of the accelerator pedal when an output value from the sensor exceeds a normal range.

Furthermore, propulsion system 124 determines that the abnormal condition has occurred in drive start control when a device that has the drive start control function is abnormal, the drive start control being control to suppress sudden acceleration at the time of change of the shift range while an accelerator on command is active.

Brake system 121 determines that the abnormal condition has occurred therein when the function of the brake of vehicle 10 is abnormal. Brake system 121 may determine that the abnormal condition has occurred therein, for example, when a brake holding function to maintain a braked state until a certain time period elapses is not activated at the time of reception of a brake off command. Alternatively, when brake system 121 receives an accelerator on command and a brake on command in parallel but drive force is generated and the brake apparatus is not preferentially activated, brake system 121 may regard a brake override function as not being activated and determine that the abnormal condition has occurred therein. Furthermore, brake system 121 may determine that the abnormal condition has occurred therein, for example, when a secondary collision brake that activates the brake and turns on a brake light does not function at the time of activation of the SRS air bag.

Furthermore, brake system 121 may determine that the abnormal condition has occurred in an anti-lock brake system (ABS) when an output value from a wheel speed sensor is abnormal, when an actuator of the ABS is abnormal, or when a brake fluid hydraulic circuit including the ABS is abnormal.

Active safety system 125 may determine whether or not various sensors (for example, camera 129A or radar sensor 129B) included in the PCS system are contaminated (abnormal), for example, based on a result of detection by the various sensors. Active safety system 125 may determine that the various sensors are contaminated, for example, when a portion corresponding to a foreign matter is steadily found in an image picked up by camera 129A.

Furthermore, active safety system 125 may determine that the abnormal condition has occurred in the SRS air bag system when the SRS air bag system does not function. Active safety system 125 may determine that the abnormal condition has occurred in the air bag system, for example, when short-circuiting or disconnection occurs in a current conduction circuit of the air bag or a drive circuit including a harness or the like, when a voltage supplied to the drive circuit is lower than a threshold value, or when a connector or the like has come off.

Furthermore, active safety system 125 may determine that the abnormal condition has occurred in a vehicle approach notification apparatus when the vehicle approach notification apparatus does not function. In an example where vehicle 10 is a battery electric vehicle or a hybrid electric vehicle, the vehicle approach notification apparatus includes an apparatus that notifies a pedestrian or the like outside the vehicle of approach of the vehicle with sound or light, for example, while vehicle 10 travels at a low speed. Active safety system 125 may determine that the abnormal condition has occurred in the vehicle approach notification apparatus, for example, when an output value from a sensor that detects a pedestrian or the like around vehicle 10 is abnormal.

Active safety system 125 may determine that the abnormal condition has occurred in the PCS system when the PCS system does not function. Active safety system 125 may determine that the abnormal condition has occurred in the PCS system, for example, when an output value from a sensor included in the PCS system is abnormal.

Steering system 122 includes a power steering system that assists an operation onto a steering wheel, with the use of an electric actuator or the like. Steering system 122 may determine that the abnormal condition has occurred in the power steering system when the electric actuator fails or an apparatus that transmits motive power from the actuator to the steering wheel fails.

Body system 126 may determine that the abnormal condition has occurred in a headlight lamp system when the headlight does not function. Body system 126 may determine that the abnormal condition has occurred in the headlight lamp system, for example, when electric power is not supplied to the headlight or when the headlight remains on and is not turned off.

Body system 126 may determine that the abnormal condition has occurred in an auxiliary battery charging system, for example, when an amount of charging (an amount of stored power) in the auxiliary battery becomes lower than a threshold value or when the abnormal condition is detected in a charging apparatus that charges the auxiliary battery such as an alternator.

Body system 126 may determine that the abnormal condition has occurred in a smart key system, for example, when a smart key does not function. Body system 126 may determine that the abnormal condition has occurred in the smart key system, for example, when a receiver that receives radio waves from the smart key fails.

Body system 126 includes, for example, a tire pressure warning system (TPWS). The TPWS system detects an air pressure of each tire of vehicle 10, and it may determine that such an abnormal condition as lowering in air pressure of the tire has occurred when the detected air pressure is lower than a threshold value. Furthermore, body system 126 may determine that the abnormal condition has occurred in the TPWS when a result of detection of the air pressure indicates an abnormal value.

In S102, VCIB 111 determines whether or not there is a request on the occurrence of the abnormal condition. When there is a stop request or the like in correspondence with various abnormal condition as described above, VCIB 111 determines that there is a request on the occurrence of the abnormal condition. When it is determined that there is a request on the occurrence of the abnormal condition (YES in S102), the process proceeds to S104.

In S104, VCIB 111 outputs a representation command to MID 112 and outputs the obtained request to ADS 202.

An exemplary representation command outputted by VCIB 111 to MID 112 in response to the obtained request and exemplary information outputted by VCIB 111 to ADS 202 in response to the obtained request will be described below.

(1) When the obtained request falls under a stop request that requests a standstill due to occurrence of the abnormal condition in brake system 121, VCIB 111 outputs to MID 112, a representation command to show a message "Braking force has lowered due to failure: Please bring the vehicle to a standstill at a safe place and check the owner's manual." and transmits the stop request to ADS 202. When the abnormal condition in at least one device of brake system 121 is detected as a result of self-diagnosis or the like, brake system 121 outputs the stop request to VCIB 111. VCIB 111 transmits information on presence or absence of the stop request set with values of "0" (no request) and "1" (requested) to ADS 202. This is also applicable to information on presence or absence of a stop request, a shift request, an engine off request, a carry-in request, a maintenance request, or a reservation request which will be described below.

(2) When the obtained request falls under the stop request that requests a standstill due to occurrence of the abnormal condition in at least one of drive systems including the hybrid system, the engine system, the hybrid battery system, and the accelerator system, it outputs to MID 112, a representation command to show a message "Please bring the vehicle to a standstill at a safe place and check the owner's manual." and transmits the stop request to ADS 202.

(3) When the obtained request falls under the stop request that requests a standstill at a travel distance within 0.5 km due to occurrence of the abnormal condition in at least one of the drive systems, it outputs to MID 112, a representation command to show a message "Please bring the vehicle to a standstill at a safe place within approximately 0.5 km." and transmits the stop request to ADS 202. A limit value of the restricted travel distance in the stop request is set in advance, for example, based on a part where the abnormal condition has occurred or a level of the abnormal condition.

(4) When the obtained request falls under the stop request that requests a standstill at a travel distance within 1.0 km due to occurrence of the abnormal condition in at least one of the drive systems, it outputs to MID 112, a representation command to show a message "Please bring the vehicle to a standstill at a safe place within approximately 1.0 km." and transmits the stop request to ADS 202.

(5) When the obtained request falls under the stop request that requests a standstill at a travel distance within 1.5 km due to occurrence of the abnormal condition in at least one of the drive systems, it outputs to MID 112, a representation command to show a message "Please bring the vehicle to a standstill at a safe place within approximately 1.5 km." and transmits the stop request to ADS 202.

(6) When the obtained request falls under the stop request that requests a standstill at a travel distance within 2.0 km due to occurrence of the abnormal condition in at least one of the drive systems, it outputs to MID 112, a representation command to show a message "Please bring the vehicle to a standstill at a safe place within approximately 2.0 km." and transmits the stop request to ADS 202.

(7) When the obtained request falls under the stop request that requests a standstill at a travel distance within 5.0 km due to occurrence of the abnormal condition in at least one of the drive systems, it outputs to MID 112, a representation command to show a message "Please bring the vehicle to a standstill at a safe place within approximately 5.0 km." and transmits the stop request to ADS 202.

(8) When the obtained request falls under the stop request that requests a standstill at a travel distance within 10 km due to occurrence of the abnormal condition in at least one of the drive systems, it outputs to MID 112, a representation command to show a message "Please bring the vehicle to a standstill at a safe place within approximately 10 km." and transmits the stop request to ADS 202.

(9) When the obtained request falls under the stop request that requests a standstill due to occurrence of the abnormal condition in at least one of the drive systems, together with shutdown of the system associated with a part where the abnormal condition has occurred, it outputs to MID 112, a representation command to show a message "The system has been shut down. Please bring the vehicle to a standstill at a safe place." and transmits the stop request to ADS 202.

(10) When the obtained request falls under the stop request that requests a prompt standstill due to occurrence of the abnormal condition in at least one of the drive systems, it outputs to MID 112, a representation command to show a message "The vehicle is unable to travel. Please bring the vehicle to a standstill at a safe place." and transmits the stop request to ADS 202.

(11) When the obtained request falls under the shift request that requests change to the P range due to occurrence of the abnormal condition in at least one of the drive systems, it outputs to MID 112, a representation command to show a message "Please set the P range and check the owner's manual." and transmits the shift request to ADS 202.

(12) When the obtained request falls under the stop request that requests a standstill due to occurrence of such an abnormal condition as excess of the temperature of engine coolant over a threshold value, it outputs to MID 112, a representation command to show a message "High temperature of engine coolant: Please bring the vehicle to a standstill at a safe place and check the owner's manual." and transmits the stop request to ADS 202.

(13) When the obtained request falls under the stop request that requests a standstill due to occurrence of such an abnormal condition as a hydraulic pressure of the engine becoming lower than a threshold value, it outputs to MID 112, a representation command to show a message "Insufficient hydraulic pressure of the engine: Please bring the vehicle to a standstill at a safe place and check the owner's manual." and transmits the stop request to ADS 202.

(14) When the obtained request falls under the stop request that requests a standstill due to occurrence of the abnormal condition in the auxiliary battery charging system, it outputs to MID 112, a representation command to show a message "Abnormal condition of the auxiliary battery charging system: Please bring the vehicle to a standstill at a safe place and check the owner's manual." and transmits the stop request to ADS 202.

(15) When the obtained request falls under the stop request that requests a standstill due to occurrence of such an abnormal condition as lowering in air pressure of the tire, it outputs to MID 112, a representation command to show a message "Please promptly check the tire at a safe place." and transmits the stop request to ADS 202.

(16) When the obtained request falls under the engine off request that requests engine stop due to the amount of charging of the auxiliary battery being lower than a threshold value, it outputs to MID 112, a representation command to show a message "The amount of stored power in the auxiliary battery has lowered and please turn off power." and transmits the engine off request to ADS 202.

(17) When the obtained request falls under the carry-in request that requests carry-in (movement) of vehicle 10 to the dealer due to the abnormal condition of the drive system by which output of vehicle 10 is significantly restricted, it outputs to MID 112, a representation command to show a message "Output has significantly lowered: Please do a check-up at the dealer." and transmits the carry-in request to ADS 202.

(18) When the obtained request falls under the carry-in request that requests refrainment of use of the N position and carry-in of vehicle 10 to the dealer due to the abnormal condition of the drive system by which output of vehicle 10 is restricted, it outputs to MID 112, a representation command to show a message "Output being restricted: Please refrain from using the N position." and transmits the carry-in request to ADS 202.

(19) When the obtained request falls under the carry-in request that requests carry-in of vehicle 10 to the dealer due to occurrence of the abnormal condition of the drive system by which restriction of use of the N position is demanded, it outputs to MID 112, a representation command to show a message "Please refrain from using the N position and do a check-up at the dealer." and transmits the carry-in request to ADS 202.

(20) When the obtained request falls under the carry-in request that requests carry-in of vehicle 10 to the dealer due to occurrence of the abnormal condition of the hybrid system by which refrainment of use of the N position is demanded for protection of the drive battery, it outputs to MID 112, a representation command to show a message "The drive battery should be protected: Please refrain from using the N position." and transmits the carry-in request to ADS 202.

(21) When the obtained request falls under the carry-in request that requests carry-in of vehicle 10 to the dealer due to occurrence of the abnormal condition of the engine system, it outputs to MID 112, a representation command to show a message "Failure of the engine: Please do a check-up at the dealer." and transmits the carry-in request to ADS 202.

(22) When the obtained request falls under the carry-in request that requests carry-in of vehicle 10 to the dealer due to occurrence of the abnormal condition of the engine system by which lowering in output of the engine for protection of the engine is demanded, it outputs to MID 112, a representation command to show a message "Output has been lowered for protection of the engine: Please do a check-up at the dealer." and transmits the carry-in request to ADS 202.

(23) When the obtained request falls under the carry-in request that requests carry-in of vehicle 10 to the dealer due to occurrence of the abnormal condition of the engine system by which maintenance is demanded, it outputs to MID 112, a representation command to show a message "Maintenance of the engine is required: Please do a check-up at the dealer." and transmits the carry-in request to ADS 202.

(24) When the obtained request falls under the carry-in request that requests carry-in of vehicle 10 to the dealer due to occurrence of the abnormal condition of the smart key system, it outputs to MID 112, a representation command to show a message "Failure of smart entry & start system: Please check the owner's manual." and transmits the carry-in request to ADS 202.

(25) When the obtained request falls under the maintenance request that requests performance of maintenance due to attachment of soiling to glass (glass lens) of a front camera (for example, camera 129A), it outputs to MID 112, a representation command to show a message "The front camera is temporarily unavailable: Please remove soiling or fogging of glass." and transmits the maintenance request to ADS 202.

(26) When the obtained request falls under the maintenance request that requests performance of maintenance due to lowering in cooling performance of a cooling apparatus that cools the drive battery, it outputs to MID 112, a representation command to show a message "Maintenance of a component that cools the drive battery is required: Please check the owner's manual." and transmits the maintenance request to ADS 202.

(27) When the obtained request falls under the maintenance request that requests performance of maintenance due to attachment of soiling to various sensors (for example, radar sensor 129B) included in the PCS system, it outputs to MID 112, a representation command to show a message "Pre crash safety is unavailable: Please remove soiling of radar." and transmits the maintenance request to ADS 202.

(28) When the obtained request falls under the maintenance request that requests performance of maintenance due to the low air pressure of the tire, it outputs to MID 112, a representation command to show a message "Please adjust the air pressure." and transmits the maintenance request to ADS 202.

(29) When the obtained request falls under the reservation request that requests a reservation for maintenance due to occurrence of the abnormal condition in at least one of the drive systems, it outputs to MID 112, a representation command to show a message "Please do a check-up at the dealer." and transmits the reservation request to ADS 202.

(30) When the obtained request falls under the reservation request that requests a reservation for maintenance due to occurrence of the abnormal condition in the drive system by which output is restricted, it outputs to MID 112, a representation command to show a message "Output being restricted: Please do a check-up at the dealer." and transmits the reservation request to ADS 202.

(31) When the obtained request falls under the reservation request that requests a reservation for maintenance due to occurrence of the abnormal condition of the power steering system, it outputs to MID 112, a representation command to show a message "Steering will be heavy due to failure. Please do a check-up at the dealer." and transmits the reservation request to ADS 202.

(32) When the obtained request falls under the reservation request that requests a reservation for maintenance due to occurrence of the abnormal condition of the power supply that supplies electric power to the power steering system, it outputs to MID 112, a representation command to show a message "Steering will be heavy due to the abnormal condition of the power supply. Please do a check-up at the dealer." and transmits the reservation request to ADS 202.

(33) When the obtained request falls under the reservation request that requests a reservation for maintenance due to occurrence of the abnormal condition of a brake holding system, it outputs to MID 112, a representation command to show a message "Failure of brake holding: Please press the brake and cancel brake holding. Please do a check-up at the dealer." and transmits the reservation request to ADS 202.

(34) When the obtained request falls under the reservation request that requests a reservation for maintenance due to occurrence of the abnormal condition of the SRS air bag system, it outputs to MID 112, a representation command to show a message "Failure of the SRS air bag: Please do a check-up at the dealer." and transmits the reservation request to ADS 202.

(35) When the obtained request falls under the reservation request that requests a reservation for maintenance due to occurrence of the abnormal condition of the ABS, it outputs to MID 112, a representation command to show a message "Failure of the ABS: Please do a check-up at the dealer." and transmits the reservation request to ADS 202.

(36) When the obtained request falls under the reservation request that requests a reservation for maintenance due to occurrence of the abnormal condition of the PCS system, it outputs to MID 112, a representation command to show a message "Failure of pre crash safety: Please do a check-up at the dealer." and transmits the reservation request to ADS 202.

(37) When the obtained request falls under the reservation request that requests a reservation for maintenance due to occurrence of the abnormal condition of a secondary collision brake system, it outputs to MID 112, a representation command to show a message "Failure of the secondary collision brake: Please do a check-up at the dealer." and transmits the reservation request to ADS 202.

(38) When the obtained request falls under the reservation request that requests a reservation for maintenance due to occurrence of the abnormal condition of an electronic brake system, it outputs to MID 112, a representation command to show a message "Braking force will be weaker due to failure. Please do a check-up at the dealer." and transmits the reservation request to ADS 202.

(39) When the obtained request falls under the reservation request that requests a reservation for maintenance due to occurrence of the abnormal condition of drive start control, it outputs to MID 112, a representation command to show a message "Failure of drive start control: Please do a check-up at the dealer." and transmits the reservation request to ADS 202.

(40) When the obtained request falls under the reservation request that requests a reservation for maintenance due to occurrence of the abnormal condition of a brake override system, it outputs to MID 112, a representation command to show a message "Failure of the brake override system: Please do a check-up at the dealer." and transmits the reservation request to ADS 202.

(41) When the obtained request falls under the reservation request that requests a reservation for maintenance due to the failure of the headlight lamp system, it outputs to MID 112, a representation command to show a message "Failure of the headlight lamp system: Please do a check-up at the dealer." and transmits the reservation request to ADS 202.

(42) When the obtained request falls under the reservation request that requests a reservation for maintenance due to the failure of the vehicle approach notification apparatus, it outputs to MID 112, a representation command to show a message "Failure of the vehicle approach notification apparatus: Please do a check-up at the dealer." and transmits the

(43) When the obtained request falls under the reservation request that requests a reservation for maintenance due to the failure of the tire pressure warning system (TPWS), it outputs to MID 112, a representation command to show a message "Failure of the TPWS: Please do a check-up at the dealer." and transmits the reservation request to ADS 202.

(44) When the obtained request falls under the reservation request that requests a reservation for maintenance due to timing of change of oil being near, it outputs to MID 112, a representation command to show a message "Oil should be changed." and transmits the reservation request to ADS 202.

(45) When the obtained request falls under the reservation request that requests a reservation for maintenance due to failure of the auxiliary battery charging system, it outputs to MID 112, a representation command to show a message "Abnormal condition of the auxiliary battery charging system: Please do a check-up at the dealer." and transmits the reservation request to ADS 202.

(46) When the obtained request falls under the notification request that requests a notification about past due of maintenance due to shortage in amount of engine oil, it outputs to MID 112, a representation command to show a message "Shortage in amount of engine oil: Please supply or change oil." and transmits the notification request to ADS 202.

(47) When the obtained request falls under the reservation request that requests a reservation for maintenance due to timing of oil change being near, it outputs to MID 112, a representation command to show a message "Oil should be changed. Please do a check-up at the dealer. Shortage in amount of engine oil: Please supply or change oil." and transmits the reservation request to ADS 202. For example, when a length of a period from the current time point until next timing of oil change is equal to or less than a threshold value, VCIB 111 determines that timing of oil change is near. The next timing of oil change is set, for example, by addition of a predetermined period to timing of previous oil change. VCIB 111 transmits to ADS 202, information on whether or not timing of oil change is near, by using one of "0" (the timing of oil change not being near) and "1" (the timing of oil change being near).

Figure 4:
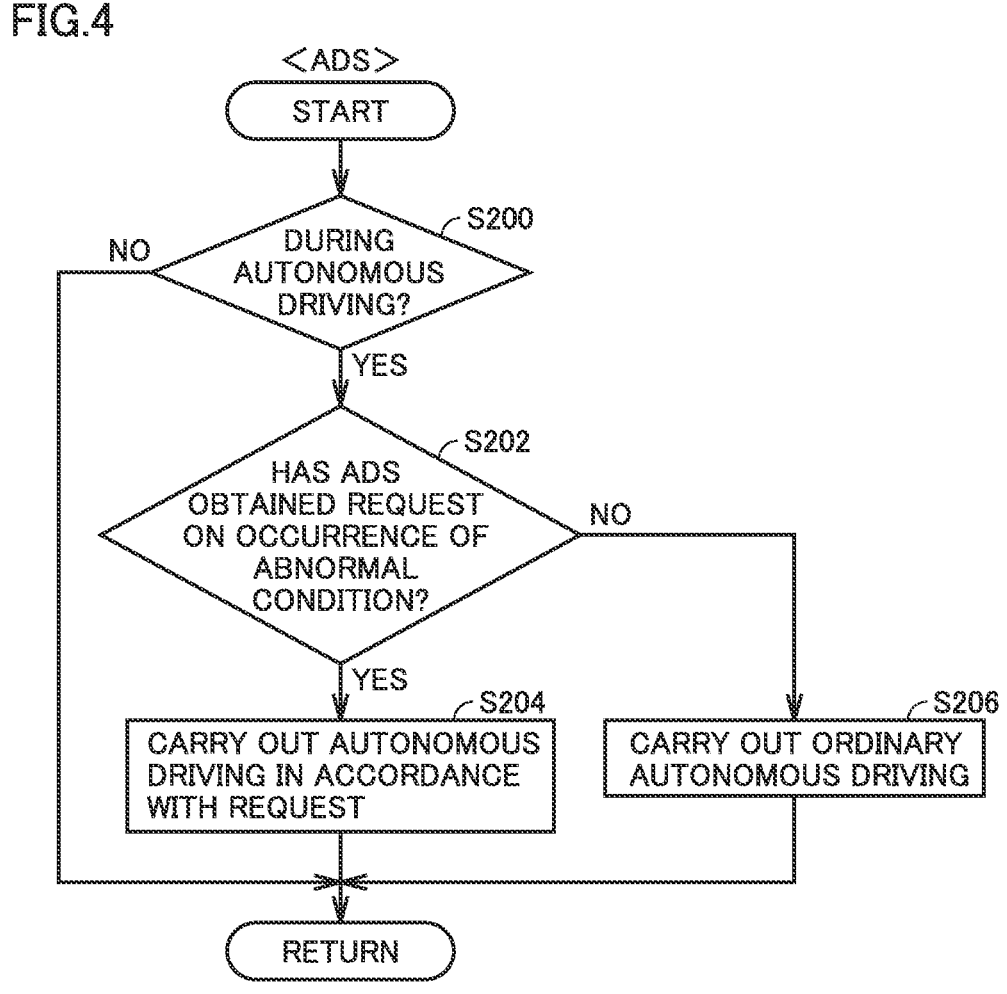
FIG. 4 is a flowchart showing exemplary processing performed in the ADS.

Processing performed by ADS 202 (more specifically, computing assembly 210) in the present embodiment will now be described with reference to FIG. 4. FIG. 4 is a flowchart showing exemplary processing performed in ADS 202. ADS 202 repeatedly performs processing as below, for example, every API execution cycle.

In S200, ADS 202 determines whether or not autonomous driving is being carried out. ADS 202 determines that autonomous driving is being carried out, for example, when a vehicle mode state has been set to an automatic mode. ADS 202 determines whether or not the vehicle mode state has been set to the automatic mode based on a status of a flag indicating the automatic mode. The flag indicating the automatic mode is set to an on state, for example, when an operation by a user onto HMI 230 for carrying out autonomous driving is accepted, and set to an off state when the automatic mode is canceled and switching to a manual mode is made in accordance with an operation by the user or a status of drive. When it is determined that autonomous driving is being carried out (YES in S200), the process makes transition to S202.

In S202, ADS 202 determines whether or not it has obtained the request on the occurrence of the abnormal condition. When ADS 202 has accepted the request or the information corresponding to one of (1) to (47) described above from VCIB 111, it determines that it has obtained the request on the occurrence of the abnormal condition. When it is determined that the ADS has obtained the request on the occurrence of the abnormal condition (YES in S202), the process makes transition to S204.

In S204, ADS 202 carries out autonomous driving in accordance with the obtained request. For example, when ADS 202 obtains the standstill request, it may have the vehicle come to a standstill at a place where traffic is not interfered. For example, when the travel distance from a position of the vehicle at the current time point to a place where the vehicle is brought to a standstill is restricted, ADS 202 may search for a standstill position within a range of the restricted distance where traffic is not interfered, and carry out autonomous driving as far as the standstill position found by the search. For example, ADS 202 sets restriction (for example, restriction of output or the like) corresponding to the abnormal condition that has occurred and carries out autonomous driving. For example, when ADS 202 has obtained the shift request, it may change the shift range to the P position after the vehicle is brought to a standstill at the place where traffic is not interfered. For example, when ADS 202 has obtained the carry-in request, it may change the destination to the closest dealer and carry out autonomous driving to the destination. When ADS 202 has obtained the reservation request, it may create a drive schedule of vehicle 10 to move to the place of the reservation or in a time frame of the reservation. For example, when ADS 202 has obtained the notification request that requests a notification about the time limit of oil change being near, it may set the closest dealer as the destination for oil change works at the time when the time limit of oil change is exceeded. Alternatively, when ADS 202 has obtained the request on the occurrence of the abnormal condition, it may change from the automatic mode to the manual mode.

In S206, ADS 202 carries out ordinary autonomous driving. Specifically, when the destination has been set, creation of a driving plan in accordance with the status of vehicle 10 and execution of vehicle control in accordance with the created driving plan are repeated until vehicle 10 arrives at the destination.

An operation of ADS 202 and VCIB 111 based on the structure and the flowchart as above will be described.

An example in which staffed vehicle 10 travels by autonomous driving is assumed. In VCIB 111, various requests are obtained from the systems (S100), and whether or not there is a request on the occurrence of the abnormal condition is determined (S102). On the other hand, in ADS 202, during autonomous driving (YES in S200), ADS 202 determines whether or not it has obtained the request on the occurrence of the abnormal condition (S202).

When VCIB 111 determines that there is no request on the occurrence of the abnormal condition (NO in S102), it does not transmit the request on the occurrence of the abnormal condition to ADS 202. Therefore, since ADS 202 does not obtain the request on the occurrence of the abnormal condition (NO in S202), it carries out ordinary autonomous driving (S206).

When VCIB 111 obtains from propulsion system 124, the stop request that requests a standstill at the travel distance within 5.0 km, for example, due to occurrence of the abnormal condition in at least one of the drive systems, it is determined that there is a request on the occurrence of the abnormal condition (YES in S102), and the message "Please bring the vehicle to a standstill at a safe place within approximately 5.0 km." is shown on MID 112 in accordance with the obtained stop request, and the stop request is transmitted to ADS 202 (S104).

Furthermore, in ADS 202, during autonomous driving (YES in S200), when ADS 202 receives the stop request, it is determined that the ADS has obtained the request on the occurrence of the abnormal condition (YES in S202), and autonomous driving in accordance with the request is carried out (S204). In other words, a place within a range of 5.0 km where traffic is not interfered is searched for, and the place found by the search is set as the destination and autonomous driving is carried out. ADS 202 has vehicle 10 come to a standstill when the vehicle arrives at the destination. The user can visually recognize the message shown on MID 112 to recognize occurrence of the abnormal condition of vehicle 10 as well as information on the abnormal condition that has occurred or maintenance to be performed, and can also manually have vehicle 10 come to a standstill.

As set forth above, according to vehicle 10 according to the present embodiment, on the occurrence of the abnormal condition, the request or the notification is outputted to ADS 202 and information corresponding to the request or the notification is given with the use of MID 112. Therefore, ADS 202 can perform an operation for performance of maintenance, and the user can recognize the maintenance to be performed or an abnormal part. Consequently, maintenance can be performed early. Therefore, a vehicle on which the autonomous driving system is mountable, the vehicle allowing early performance of maintenance when maintenance of the vehicle is demanded, a method of controlling a vehicle, and a vehicle control interface box can be provided.

Since ADS 202 can perform an operation for performance of maintenance when it obtains the request on the occurrence of the abnormal condition, maintenance can be performed early.

Since information corresponding to the request or the notification is given with the use of MID 112, the user can recognize the maintenance to be performed and maintenance can be performed early.

EXAMPLE

API Specification for TOYOTA Vehicle Platform
  Ver. 1.1
Records of Revision

| Date of Revision | ver. | Overview of Revision | Reviser |
|---|---|---|---|
| 2020 May 23 | 1.0 | Creating a new material | TOYOTA MOTOR Corp. |
| 2021 Apr. 14 | 1.1 | The figure of Front Wheel Steer Angle Rate Limitation is updated. Explanation of Standstill Status is added. | TOYOTA MOTOR Corp. |

Table of Contents

1. Introduction
   1.1. Purpose of this Specification
   1.2. Target Vehicle
   1.3. Definition of Term
2. Structure
   2.1. Overall Structure of Autono-MaaS Vehicle
   2.2. System Structure of Autono-MaaS Vehicle
3. Application Interfaces
   3.1. Typical Usage of APIs
   3.2. APIs for Vehicle Motion Control
      3.2.1. API List for Vehicle Motion Control
      3.2.2. Details of Each API for Vehicle Motion Control
   3.3. APIs for BODY Control
      3.3.1. API List for BODY Control
      3.3.2. Details of Each API for BODY Control
   3.4. APIs for Power Control
      3.4.1. API List for Power Control
      3.4.2. Details of Each API for Power Control
   3.5. APIs for Failure Notification
      3.5.1. API List for Failure Notification
      3.5.2. Details of Each API for Failure Notification
   3.6. APIs for Security
      3.6.1. API List for Security
      3.6.2. Details of Each API for Security
4. API Guides to Control Toyota Vehicles
   4.1. APIs for Vehicle Motion Control
      4.1.1. API List for Vehicle Motion Control
      4.1.2. API Guides in Details for Vehicle Motion Control
   4.2. APIs for BODY Control
      4.2.1. API List for BODY Control
   4.3. APIs for Power Control
      4.3.1. API List for Power Control
   4.4. APIs for Failure Notification
      4.4.1. API List for Failure Notification
   4.5. APIs for Security
      4.5.1. API List for Security
      4.5.2. API Guides in Details for Security

1. Introduction

1.1. Purpose of this Specification

This document is an API specification of vehicle control interface for Autono-MaaS vehicles and contains outline, the way to use and note of APIs.

1.2. Target Vehicle

This specification is applied to the Autono-MaaS vehicles defined by [Architecture Specification for TOYOTA Vehicle Platform attached with Automated Driving System].

1.3. Definition of Term

TABLE 1

| Definition of Term | |
|---|---|
| Term | Definition |
| ADS | Autonomous Driving System |
| ADK | Autonomous Driving Kit |

TABLE 1-continued

| Definition of Term | |
|---|---|
| Term | Definition |
| VP | Vehicle Platform |
| VCIB | Vehicle Control Interface Box. This is an ECU for the interface and the signal converter between ADS and VP's sub systems. |
| PCS | Pre-Collision Safety |

2. Structure

2.1. Overall Structure of Autono-MaaS Vehicle

Figure 5:
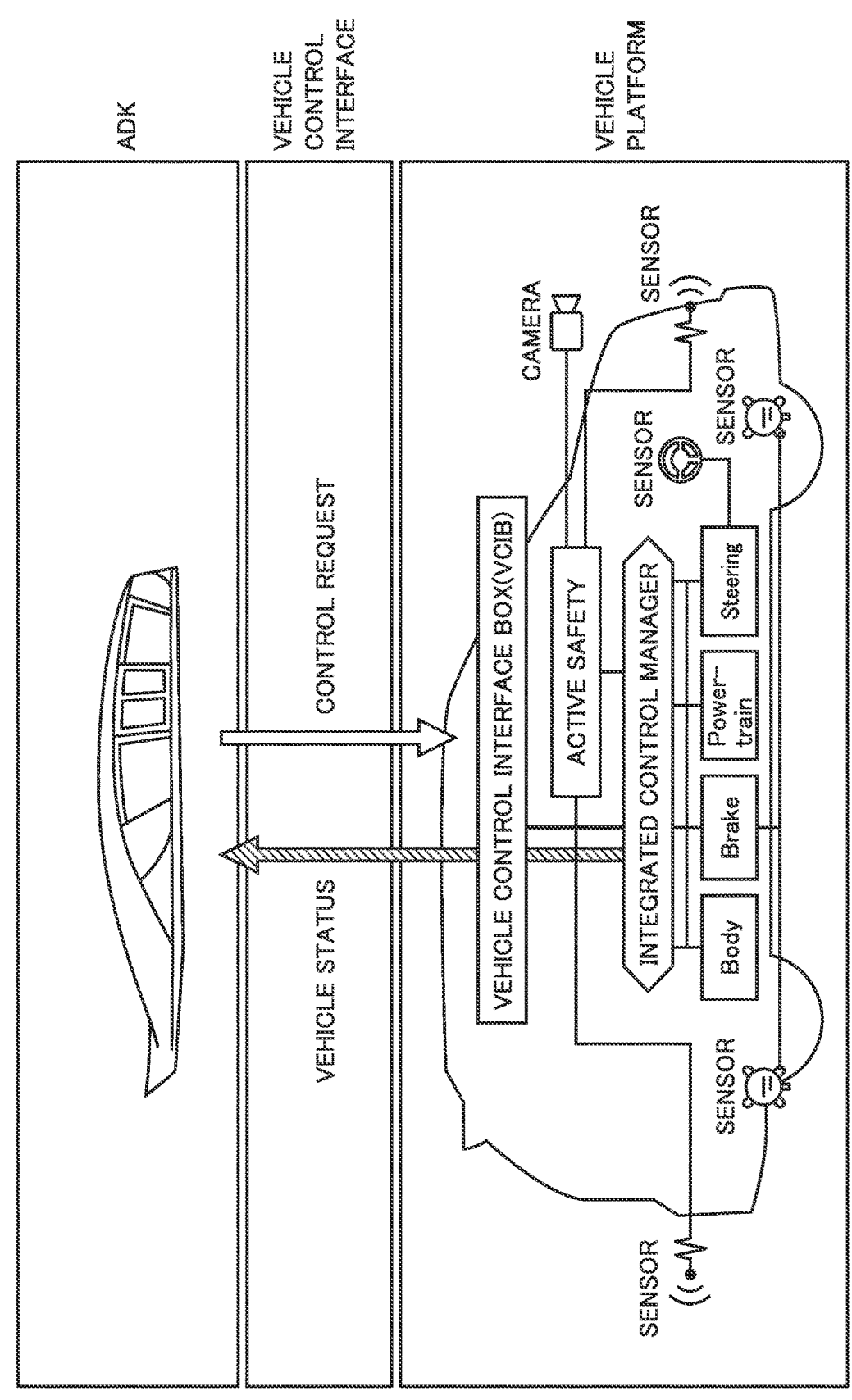
FIG. 5 is a diagram showing an overall structure of an Autono-MaaS vehicle.

The overall structure of Autono-MaaS is shown (FIG. 5).

2.2. System Structure of Autono-MaaS Vehicle

Figure 6:
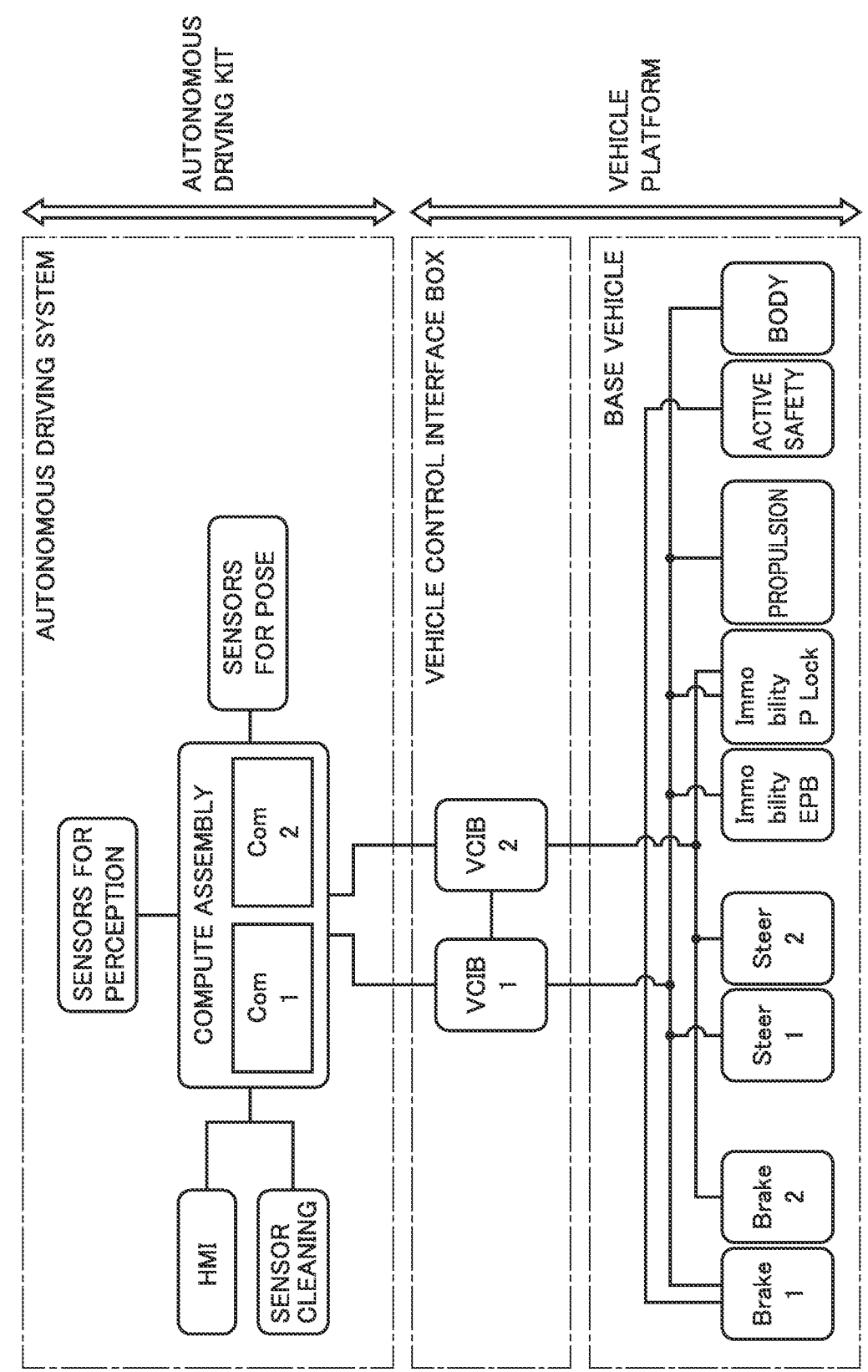
FIG. 6 is a diagram showing a system architecture of the Autono-MaaS vehicle.

System Architecture is shown in FIG. 6.

3. Application Interfaces

3.1. Typical Usage of APIs

In this section, Typical Usage of APIs is described.

A typical workflow of APIs is as follows (FIG. 7). The following example assumes CAN for physical communication.

3.2. APIs for Vehicle Motion Control

In this section, the APIs for vehicle motion control are described.

3.2.1. API List for Vehicle Motion Control 3.2.1.1. Inputs

TABLE 3

| Input APIs for vehicle motion control | | |
|---|---|---|
| Signal Name | Description | Redundancy |
| Propulsion Direction Command | Request for shift change from/to forward (D range) to/from back (R range) | N/A |
| Immobilization Command | Request for turning on/off WheelLock | Applied |
| Standstill Command | Request for keeping on/off stationary | Applied |
| Acceleration Command | Request for acceleration/deceleration | Applied |
| Front Wheel Steer Angle Command | Request for front wheel steer angle | Applied |
| Vehicle Mode Command | Request for changing from/to manual mode to/from Autonomous Mode | Applied |
| High Dynamics Command | Request for increasing braking response performance* | Applied |

*Reaction time in VP upon a request from ADK 3.2.1.2. Outputs

TABLE 4

| | Output APIs for vehicle motion control | |
| --- | --- | --- |
| Signal Name | Description | Redundancy |
| Propulsion Direction Status | Current shift status | N/A |
| Immobilization Status | Status of immobilization (i.e. EPB and Shift P) | Applied |
| Standstill Status | Standstill status | N/A |
| Estimated Gliding Acceleration | Estimated vehicle acceleration/deceleration when throttle is fully closed | N/A |
| Estimated maximum acceleration | Estimated maximum acceleration | Applied |
| Estimated maximum deceleration | Estimated maximum deceleration | Applied |
| Front wheel steer angle | Front wheel steer angle | Applied |
| Front wheel steer angle rate | Front wheel steer angle rate | Applied |
| Front wheel steer angle rate limitation | Road wheel angle rate limit | Applied |
| Estimated maximum lateral acceleration | Estimated max lateral acceleration | Applied |
| Estimated maximum lateral acceleration rate | Estimated max lateral acceleration rate | Applied |
| Intervention of accelerator pedal | This signal shows whether the accelerator pedal is depressed by a driver (intervention) | N/A |
| Intervention of brake pedal | This signal shows whether the brake pedal is depressed by a driver (intervention) | N/A |
| Intervention of steering wheel | This signal shows whether the steering wheel is turned by a driver (intervention) | N/A |
| Intervention of shift lever | This signal shows whether the shift lever is controlled by a driver (intervention) | N/A |
| Wheel speed pulse (front left) | Pulse from wheel speed sensor (Front Left Wheel) | N/A |
| Wheel rotation direction (front left) | Rotation direction of wheel (Front Left) | N/A |
| Wheel speed pulse (front right) | Pulse from wheel speed sensor (Front Right Wheel) | N/A |
| Wheel rotation direction (front right) | Rotation direction of wheel (Front Right) | N/A |
| Wheel speed pulse (rear left) | Pulse from wheel speed sensor (Rear Left Wheel) | Applied |
| Wheel rotation direction (Rear left) | Rotation direction of wheel (Rear Left) | Applied |
| Wheel speed pulse (rear right) | Pulse from wheel speed sensor (Rear Right Wheel) | Applied |
| Wheel rotation direction (Rear right) | Rotation direction of wheel (Rear Right) | Applied |
| Traveling direction | Moving direction of vehicle | Applied |
| Vehicle velocity | Estimated longitudinal velocity of vehicle | Applied |
| Longitudinal acceleration | Estimated longitudinal acceleration of vehicle | Applied |
| Lateral acceleration | Sensor value of lateral acceleration of vehicle | Applied |
| Yawrate | Sensor value of yaw rate | Applied |
| Slipping Detection | Detection of tire glide/spin/skid | Applied |
| Vehicle mode state | State of whether Autonomous Mode, manual mode | Applied |
| Readiness for autonomization | Situation of whether the vehicle can transition to Autonomous Mode or not | Applied |
| Failure status of VP functions for Autonomous Mode | This signal is used to show whether VP functions have some failures mode when a vehicle works as Autonomous Mode. | Applied |
| PCS Alert Status | Status of PCS (Alert) | N/A |
| PCS Preparation Status | Status of PCS (Prefill) | N/A |
| PCS Brake/PCS Brake Hold Status | Status of PCS (PB/PBH) | N/A |
| ADS/PCS arbitration status | ADS/PCS arbitration status | N/A |

3.2.2. Details of Each API for Vehicle Motion Control 3.2.2.1. Propulsion Direction Command Request for shift change from/to forward (D range) to/from back (R range)

Values

| Value | Description | Remarks |
| --- | --- | --- |
| 0 | No Request | |
| 2 | R | Shift to R range |
| 4 | D | Shift to D range |
| other | Reserved | |

Remarks

Available only when Vehicle mode state="Autonomous Mode."

Available only when a vehicle is stationary (Traveling direction="standstill").

Available only when brake is applied.

3.2.2.2. Immobilization Command

Request for turning on/off WheelLock

Values

The following table shows a case where EPB and Shift P are used for immobilization.

| Value | Description | Remarks |
| --- | --- | --- |
| 0 | No Request | |
| 1 | Applied | EPB is turned on and shift position is changed to "P" |
| 2 | Released | EPB is turned off and shift position is changed to the value of Propulsion Direction Command |

Remarks

This API is used for parking a vehicle.

Available only when Vehicle mode state="Autonomous Mode."

Changeable only when the vehicle is stationary (Traveling direction="standstill").

Changeable only while brake is applied.

3.2.2.3. Standstill Command

Request for applying/releasing brake holding function

Values

| Value | Description | Remarks |
|---|---|---|
| 0 | No Request | |
| 1 | Applied | Brake holding function is allowed. |
| 2 | Released | |

Remarks

This API is used for choosing a status of whether the brake holding function is allowed.

Available only when Vehicle mode state="Autonomous Mode."

Acceleration Command (deceleration request) has to be continued until Standstill Status becomes "Applied".

3.2.2.4. Acceleration Command

Request for acceleration

Values

Estimated maximum deceleration to Estimated maximum acceleration [m/s$^2$]

Remarks

Available only when Vehicle mode state="Autonomous Mode."

Acceleration (+) and deceleration (−) request based on Propulsion Direction Status direction.

The upper/lower limit will vary based on Estimated maximum deceleration and Estimated maximum acceleration.

When acceleration more than Estimated maximum acceleration is requested, the request is set to Estimated maximum acceleration.

When deceleration more than Estimated maximum deceleration is requested, the request is set to Estimated maximum deceleration.

In case where a driver operates a vehicle (over-ride), the requested acceleration may not be achieved.

When PCS simultaneously works, VP should choose minimum acceleration (maximum deceleration).

3.2.2.5. Front Wheel Steer Angle Command

Values

| Value | Description | Remarks |
|---|---|---|
| — | [unit: rad] | |

Remarks

Available only when Vehicle mode state="Autonomous Mode"

Left is positive value (+). Right is negative value (−).

Front wheel steer angle is set to value (0) when the vehicle is going straight.

This request is set as a relative value from the current one to prevent misalignment of "Front Wheel Steer Angle" from being accumulated.

The request value should be set within Front wheel steer angle rate limitation.

In case where a driver operates a vehicle (over-ride), the requested Front Wheel Steer Angle may not be achieved.

3.2.2.6. Vehicle Mode Command

Request for changing from/to manual mode to/from Autonomous Mode

Values

| Value | Description | Remarks |
|---|---|---|
| 0 | No Request | |
| 1 | Request For Autonomy | |
| 2 | Deactivation Request | means transition request to manual mode |

Remarks

N/A 3.2.2.7. High Dynamics Command

If ADK would like to increase braking response performance* of VP, High Dynamics Command should be set to "High".

*Reaction time in VP upon a request from ADK

Values

| Value | Description | Remarks |
|---|---|---|
| 0 | No Request | |
| 1 | High | |
| 2-3 | Reserved | |

Remarks

N/A 3.2.2.8. Propulsion Direction Status

Current shift Status

Values

| Value | Description | Remarks |
|---|---|---|
| 0 | Reserved | |
| 1 | P | |
| 2 | R | |
| 3 | N | |
| 4 | D | |
| 5 | Reserved | |
| 6 | Invalid value | |

Remarks

If VP does not know the current shift status, this output is set to "Invalid Value."

3.2.2.9. Immobilization Status

Each immobilization system status

Values

The following table shows a case where EPB and Shift P are used for immobilization.

| Value | | Description | Remarks |
|---|---|---|---|
| Shift | EPB | | |
| 0 | 0 | Shift set to other than P, and EPB Released | |
| 1 | 0 | Shift set to P and EPB Released | |
| 0 | 1 | Shift set to other than P, and EPB applied | |
| 1 | 1 | Shift set to P and EPB Applied | |

Remarks

N/A 3.2.2.10. Standstill Status

Status of Standstill

Values

| Value | Description | Remarks |
|---|---|---|
| 0 | Released | |
| 1 | Applied | |
| 2 | Reserved | |
| 3 | Invalid value | |

Remarks

N/A 3.2.2.11. Estimated Gliding Acceleration

Acceleration calculated in VP in case that throttle is closed, considering slope, road load and etc.

Values

[unit: m/s$^2$]

Remarks

When the Propulsion Direction Status is "D", acceleration for forward direction shows a positive value.

When the Propulsion Direction Status is "R", acceleration for reverse direction shows a positive value.

3.2.2.12. Estimated Maximum Acceleration

Acceleration calculated in VP in case that throttle is fully open, considering slope, road load and etc.

Values

[unit: m/s$^2$]

Remarks

When the Propulsion Direction Status is "D", acceleration for forward direction shows a positive value.

When the Propulsion Direction Status is "R", acceleration for reverse direction shows a positive value.

3.2.2.13. Estimated Maximum Deceleration

Maximum deceleration calculated in VP in case that brake in VP is requested as maximum, considering slope, road load and etc.

Values

[unit: m/s$^2$]

Remarks

When the Propulsion Direction Status is "D", deceleration for forward direction shows a negative value.

When the Propulsion Direction Status is "R", deceleration for reverse direction shows a negative value.

3.2.2.14. Front Wheel Steer Angle

Values

| Value | Description | Remarks |
|---|---|---|
| Minimum Value | Invalid value | |
| others | [unit: rad] | |

Remarks

Left is positive value (+). Right is negative value (−).

This signal should show invalid value until VP can calculate correct value or when the sensor is invalid/failed.

3.2.2.15. Front Wheel Steer Angle Rate

Front wheel steer angle rate

Values

| Value | Description | Remarks |
|---|---|---|
| Minimum Value | Invalid value | |
| others | [unit: rad/s] | |

Remarks

Left is positive value (+). Right is negative value (−).

This signal should show invalid value until VP can calculate correct value or when Front wheel steer angle shows the minimum value.

3.2.2.16. Front Wheel Steer Angle Rate Limitation

The limit of the Front wheel steer angle rate

Values

[unit: rad/s]

Remarks

Figure 8:
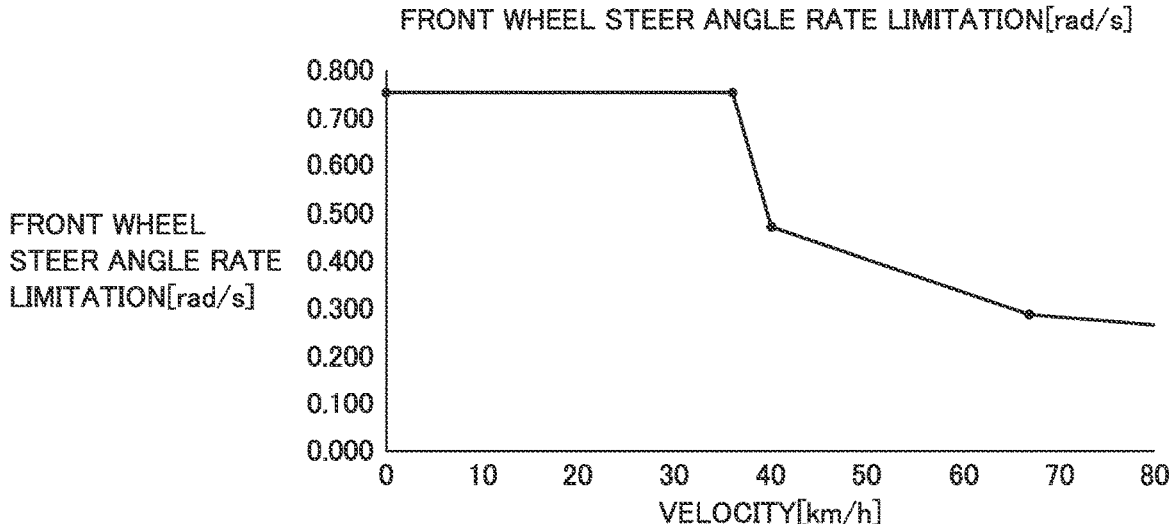
FIG. 8 is a diagram showing relation between a front wheel steer angle rate limitation and a velocity.

The limitation is calculated from the "vehicle speed—steering angle rate" map as shown in following Table 5 and FIG. 8.

A) At a low speed or stopped situation, use fixed value (0.751 [rad/s]).

B) At a higher speed, the steering angle rate is calculated from the vehicle speed using 3.432 m/s$^3$.

TABLE 5

| "vehicle speed - steering angle rate" map | | | | | |
|---|---|---|---|---|---|
| Velocity [km/h] | 0.0 | 36.0 | 40.0 | 67.0 | 84.0 |
| Front Wheel Steer Angle Rate Limitation [rad/s] | 0.751 | 0.751 | 0.469 | 0.287 | 0.253 |

3.2.2.17. Estimated Maximum Lateral Acceleration

Values

[unit: m/s$^2$] (fixed value: 3.432)

Remarks

Maximum lateral acceleration defined for VP.

3.2.2.18. Estimated Maximum Lateral Acceleration Rate

Values

[unit: m/s$^3$] (fixed value: 3.432)

Remarks

Maximum lateral acceleration rate defined for VP.

3.2.2.19. Intervention of Accelerator Pedal

This signal shows whether the accelerator pedal is depressed by a driver (intervention).

Values

| Value | Description | Remarks |
|---|---|---|
| 0 | Not depressed | |
| 1 | depressed | |
| 2 | Beyond autonomy acceleration | |

Remarks

When a position of accelerator pedal is higher than a defined threshold, this signal is set to "depressed".

When the requested acceleration calculated from a position of accelerator pedal is higher than the requested acceleration from ADS, this signal is set as "Beyond autonomy acceleration."

3.2.2.20. Intervention of Brake Pedal

This signal shows whether the brake pedal is depressed by a driver (intervention).

Values

| Value | Description | Remarks |
|---|---|---|
| 0 | Not depressed | |
| 1 | depressed | |
| 2 | Beyond autonomy deceleration | |

Remarks

When a position of brake pedal is higher than the defined threshold value, this signal is set to "depressed".

When the requested deceleration calculated from a position of brake pedal is higher than the requested deceleration from ADS, this signal is set as "Beyond autonomy deceleration".

3.2.2.21. Intervention of Steering Wheel

This signal shows whether the steering wheel is operated by a driver (intervention).

Values

| Value | Description | Remarks |
|---|---|---|
| 0 | Not turned | |
| 1 | ADS and driver collaboratively work | |
| 2 | Only by human driver | |

Remarks

In "Intervention of steering wheel=1", considering the human driver's intent, EPS system drives the steering with the Human driver collaboratively.

In "Intervention of steering wheel=2", considering the human driver's intent, the steering request from ADS is not achieved. (The steering will be driven by human driver.)

3.2.2.22. Intervention of Shift Lever

This signal shows whether the shift lever is controlled by a driver (intervention)

Values

| Value | Description | Remarks |
|---|---|---|
| 0 | OFF | |
| 1 | ON | Controlled (moved to any shift position) |

Remarks

N/A

3.2.2.23. Wheel Speed Pulse (Front Left), Wheel Speed Pulse (Front Right), Wheel Speed Pulse (Rear Left), Wheel Speed Pulse (Rear Right)

Values

| Value | Description | Remarks |
|---|---|---|
| Maximum Value in transmission bits | Invalid value | The sensor is invalid. |
| others | ticks [unit: —] | The number of pulses per one round wheel depends on VP. |

Remarks

A pulse value is integrated at the pulse falling timing.

This wheel speed sensor outputs 96 pulses with a single rotation.

Regardless of invalid/failure of wheel speed sensor, wheel speed pulse will be updated.

When "1" is subtracted from a pulse value which shows "0", the value changes to "0xFF". When "1" is added to a pulse value which shows "0xFF", the value changes to "0".

Until the rotation direction is determined just after ECU is activated, a pulse value will be added as the rotation direction is "Forward".

When detected forward rotation, a pulse value will be added.

When detected reverse rotation, a pulse value will be subtracted.

3.2.2.24. Wheel Rotation Direction (Front Left), Wheel Rotation Direction (Front Right), Wheel Rotation Direction (Rear Left), Wheel Rotation Direction (Rear Right)

| Value | Description | Remarks |
|---|---|---|
| 0 | Forward | |
| 1 | Reverse | |
| 2 | Reserved | |
| 3 | Invalid value | The sensor is invalid. |

Remarks

"Forward" is set until the rotation direction is determined after VP is turned on.

3.2.2.25. Traveling Direction

Moving direction of vehicle

Values

| Value | Description | Remarks |
|---|---|---|
| 0 | Forward | |
| 1 | Reverse | |
| 2 | Standstill | |
| 3 | Undefined | |

Remarks

This signal shows "Standstill" when four wheel speed values are "0" during a constant time.

When shift is changed right after vehicle starts, it is possible to be "Undefined".

3.2.2.26. Vehicle Velocity

Estimated longitudinal velocity of vehicle

Values

| Value | Description | Remarks |
|---|---|---|
| Maximum Value in transmission bits | Invalid value | The sensor is invalid. |
| others | Velocity [unit: m/s] | |

Remarks

The value of this signal is a positive value when both forward direction and reverse direction.

3.2.2.27. Longitudinal Acceleration

Estimated longitudinal acceleration of vehicle

Values

| Value | Description | Remarks |
|---|---|---|
| Minimum Value in transmission bits | Invalid value | The sensor is invalid. |
| others | Acceleration [unit: m/s$^2$] | |

Remarks

Acceleration (+) and deceleration (−) value based on Propulsion Direction Status direction.

3.2.2.28. Lateral Acceleration lateral acceleration of vehicle

Values

| Value | Description | Remarks |
|---|---|---|
| Minimum Value in transmission bits | Invalid value | The sensor is invalid. |
| others | Acceleration [unit: m/s$^2$] | |

Remarks

A positive value shows counterclockwise. A negative value shows clockwise.

3.2.2.29. Yaw Rate

Sensor value of yaw rate

Values

| Value | Description | Remarks |
|---|---|---|
| Minimum Value in transmission bits | Invalid value | The sensor is invalid. |
| others | Yaw rate [unit: deg/s] | |

Remarks

A positive value shows counterclockwise. A negative value shows clockwise.

3.2.2.30. Slipping Detection

Detection of tire glide/spin/skid

Values

| Value | Description | Remarks |
|---|---|---|
| 0 | Not Slipping | |
| 1 | Slipping | |
| 2 | Reserved | |
| 3 | Invalid value | |

Remarks

This signal is determined as "Slipping" when any of the following systems has been activated.

ABS (Anti-lock Braking System)

TRC (TRaction Control)

VSC (Vehicle Stability Control)

VDIM (Vehicle Dynamics Integrated Management)

3.2.2.31. Vehicle Mode State

Autonomous or manual mode

Values

| Value | Description | Remarks |
|---|---|---|
| 0 | Manual Mode | The mode starts from Manual mode. |
| 1 | Autonomous Mode | |

Remarks

The initial state is set to "Manual Mode."

3.2.2.32. Readiness for Autonomization

This signal shows whether a vehicle can change to Autonomous Mode or not

Values

| Value | Description | Remarks |
|---|---|---|
| 0 | Not Ready For Autonomous Mode | |
| 1 | Ready For Autonomous Mode | |
| 3 | Invalid | The status is not determined yet. |

Remarks

N/A 3.2.2.33. Failure Status of VP Functions for Autonomous Mode

This signal is used to show whether VP functions have some failures mode when a vehicle works as Autonomous Mode.

Values

| Value | Description | Remarks |
|---|---|---|
| 0 | No fault | |
| 1 | Fault | |
| 3 | Invalid | The status is not determined yet. |

Remarks

N/A 3.2.2.34. PCS Alert Status

Values

| Value | Description | Remarks |
|---|---|---|
| 0 | Normal | |
| 1 | Alert | Request alert from PCS system |
| 3 | Unavailable | |

Remarks

N/A 3.2.2.35. PCS Preparation Status

Prefill Status as the preparation of PCS Brake

Values

| Value | Description | Remarks |
|---|---|---|
| 0 | Normal | |
| 1 | Active | |
| 3 | Unavailable | |

Remarks

"Active" is a status in which PCS prepares brake actuator to shorten the latency from a deceleration request issued by PCS.

When a value turns to "Active" during Vehicle mode state="Autonomous Mode," "ADS/PCS arbitration status" shows "ADS".

3.2.2.36. PCS Brake/PCS Brake Hold Status

Values

| Value | Description | Remarks |
|---|---|---|
| 0 | Normal | |
| 1 | PCS Brake | |
| 2 | PCS Brake Hold | |
| 7 | Unavailable | |

Remarks

N/A 3.2.2.37. ADS/PCS Arbitration Status

Arbitration status

Values

| Value | Description | Remarks |
|---|---|---|
| 0 | No Request | |
| 1 | ADS | ADS |
| 2 | PCS | PCS Brake or PCS Brake Hold |
| 3 | Invalid value | |

Remarks

When acceleration requested by PCS system in VP is smaller than one requested by ADS, the status is set as "PCS".

When acceleration requested by PCS system in VP is larger than one requested by ADS, the status is set as "ADS".

3.3. APIs for BODY Control 3.3.1. API List for BODY Control 3.3.1.1. Inputs

TABLE 6

| Input APIs for BODY Control | | |
|---|---|---|
| Signal Name | Description | Redundancy |
| Turnsignal command | Command to control the turnsignallight mode of the vehicle platform | N/A |
| Headlight command | Command to control the headlight mode of the vehicle platform | N/A |
| Hazardlight command | Command to control the hazardlight mode of the vehicle platform | N/A |
| Horn pattern command | Command to control the pattern of horn ON-time and OFF-time per cycle of the vehicle platform | N/A |
| Horn cycle command | Command to control the number of horn ON/OFF cycles of the vehicle platform | N/A |
| Continuous horn command | Command to control of horn ON of the vehicle platform | N/A |
| Front windshield wiper command | Command to control the front windshield wiper of the vehicle platform | N/A |
| Rear windshield wiper command | Command to control the rear windshield wiper mode of the vehicle platform | N/A |
| HVAC (1st row) operation command | Command to start/stop 1st row air conditioning control | N/A |
| HVAC (2nd row) operation command | Command to start/stop 2nd row air conditioning control | N/A |
| Target temperature (1st left) command | Command to set the target temperature around front left area | N/A |
| Target temperature (1st right) command | Command to set the target temperature around front right area | N/A |
| Target temperature (2nd left) command | Command to set the target temperature around rear left area | N/A |
| Target temperature (2nd right) command | Command to set the target temperature around rear right area | N/A |
| HVAC fan (1st row) command | Command to set the fan level on the front AC | N/A |
| HVAC fan (2nd row) command | Command to set the fan level on the rear AC | N/A |
| Air outlet (1st row) command | Command to set the mode of 1st row air outlet | N/A |
| Air outlet (2nd row) command | Command to set the mode of 2nd row air outlet | N/A |
| Air recirculation command | Command to set the air recirculation mode | N/A |
| AC mode command | Command to set the AC mode | N/A |

3.3.1.2. Outputs

TABLE 7

| Output APIs for BODY Control | | |
|---|---|---|
| Signal Name | Description | Redundancy |
| Turnsignal status | Status of the current turnsignallight mode of the vehicle platform | N/A |
| Headlight status | Status of the current headlight mode of the vehicle platform | N/A |
| Hazard light status | Status of the current hazardlight mode of the vehicle platform | N/A |
| Horn status | Status of the current horn of the vehicle platform | N/A |
| Front windshield wiper status | Status of the current front windshield wiper mode of the vehicle platform | N/A |
| Rear windshield wiper status | Status of the current rear windshield wiper mode of the vehicle platform | N/A |
| HVAC (1st row) status | Status of activation of the $1^{st}$ row HVAC | N/A |
| HVAC (2nd row) status | Status of activation of the $2^{nd}$ row HVAC | N/A |
| Target temperature (1st left) status | Status of set temperature of $1^{st}$ row left | N/A |
| Target temperature (1st right) status | Status of set temperature of $1^{st}$ row right | N/A |
| Target temperature (2nd left) status | Status of set temperature of $2^{nd}$ row left | N/A |
| Target temperature (2nd right) status | Status of set temperature of $2^{nd}$ row right | N/A |
| HVAC fan (1st row) status | Status of set fan level of $1^{st}$ row | N/A |
| HVAC fan (2nd row) status | Status of set fan level of $2^{nd}$ row | N/A |
| Air outlet (1st row) status | Status of mode of 1st row air outlet | N/A |
| Air outlet (2nd row) status | Status of mode of 2nd row air outlet | N/A |
| Air recirculation status | Status of set air recirculation mode | N/A |
| AC mode status | Status of set AC mode | N/A |
| Seat occupancy (1st right) status | Seat occupancy status in 1st right seat | N/A |
| Seat belt (1st left) status | Status of driver's seat belt buckle switch | N/A |
| Seat belt (1st right) status | Status of passenger's seat belt buckle switch | N/A |
| Seat belt (2nd left) status | Seat belt buckle switch status in 2nd left seat | N/A |
| Seat belt (2nd right) status | Seat belt buckle switch status in 2nd right seat | N/A |
| Seat belt (3rd left) status | Seat belt buckle switch status in 3rd left seat | N/A |
| Seat belt (3rd center) status | Seat belt buckle switch status in 3rd center seat | N/A |
| Seat belt (3rd right) status | Seat belt buckle switch status in 3rd right seat | N/A |

3.3.2. Details of Each API for BODY Control

3.3.2.1. Turnsignal Command

Request to control turn-signal

Values

| Value | Description | Remarks |
|---|---|---|
| 0 | OFF | |
| 1 | Right | Right blinker ON |
| 2 | Left | Left blinker ON |
| 3 | Reserved | |

Remarks

N/A

3.3.2.2. Headlight Command

Request to control headlight

Values

| Value | Description | Remarks |
|---|---|---|
| 0 | No Request | Keep current mode |
| 1 | TAIL mode request | Side lamp mode |
| 2 | HEAD mode request | Lo mode |

-continued

| Value | Description | Remarks |
|---|---|---|
| 3 | AUTO mode request | Auto mode |
| 4 | HI mode request | Hi mode |
| 5 | OFF Mode Request | |
| 6-7 | Reserved | |

Remarks

This command is valid when headlight mode on the combination switch="OFF" or "Auto mode=ON."

Driver operation overrides this command.

3.3.2.3. Hazardlight Command

Request to control hazardlight

Values

| Value | Description | Remarks |
|---|---|---|
| 0 | No Request | |
| 1 | ON | |

Remarks

Driver operation overrides this command.

Hazardlight is ON while receiving "ON" command.

3.3.2.4. Horn Pattern Command

Request to choose a pattern of ON-time and OFF-time per cycle

Values

| Value | Description | Remarks |
|---|---|---|
| 0 | No request | |
| 1 | Pattern 1 | ON-time: 250 ms OFF-time: 750 ms |
| 2 | Pattern 2 | ON-time: 500 ms OFF-time: 500 ms |
| 3 | Pattern 3 | Reserved |
| 4 | Pattern 4 | Reserved |
| 5 | Pattern 5 | Reserved |
| 6 | Pattern 6 | Reserved |
| 7 | Pattern 7 | Reserved |

Remarks

N/A 3.3.2.5. Horn Cycle Command

Request to choose the number of ON and OFF cycles

Values 0 to 7 [–]

Remarks

N/A 3.3.2.6. Continuous Horn Command

Request to turn on/off horn

Values

| Value | Description | Remarks |
|---|---|---|
| 0 | No request | |
| 1 | ON | |

Remarks

This command's priority is higher than 3.3.2.4 Horn pattern and 3.3.2.5 Horn cycle command.

Horn is "ON" while receiving "ON" command.

3.3.2.7. Front Windshield Wiper Command

Request to control front windshield wiper

| Value | Description | Remarks |
|---|---|---|
| 0 | OFF mode request | |
| 1 | Lo mode request | |
| 2 | Hi mode request | |
| 3 | Intermittent mode request | |
| 4 | Auto mode request | |
| 5 | Mist mode request | One-time wiping |
| 6, 7 | Reserved | |

Remarks

This command is valid when front windshield wiper mode on a combination switch is "OFF" or "AUTO".

Driver input overrides this command.

Windshieldwiper mode is kept while receiving a command.

Wiping speed of intermittent mode is fixed.

3.3.2.8. Rear Windshield Wiper Command

Request to control rear windshield wiper

Values

| Value | Description | Remarks |
|---|---|---|
| 0 | OFF mode request | |
| 1 | Lo mode request | |
| 2 | Reserved | |
| 3 | Intermittent mode request | |
| 4-7 | Reserved | |

Remarks

Driver input overrides this command

Windshieldwiper mode is kept while receiving a command.

Wiping speed of intermittent mode is fixed.

3.3.2.9. HVAC (1st Row) Operation Command

Request to start/stop 1st row air conditioning control

Values

| Value | Description | Remarks |
|---|---|---|
| 0 | No request | |
| 1 | ON | |
| 2 | OFF | |

Remarks

N/A 3.3.2.10. HVAC (2nd Row) Operation Command

Request to start/stop 2nd row air conditioning control

Values

| Value | Description | Remarks |
|---|---|---|
| 0 | No request | |
| 1 | ON | |
| 2 | OFF | |

Remarks

N/A 3.3.2.11. Target Temperature (1st Left) Command

Request to set target temperature in front left area

Values

| Value | Description | Remarks |
|---|---|---|
| 0 | No request | |
| 60 to 85 [unit: ° F.] (by 1.0° F.) | Target temperature | |

Remarks

In case ° C. is used in VP, value should be set as ° C.

3.3.2.12. Target Temperature (1st Right) Command

Request to set target temperature in front right area

Values

| Value | Description | Remarks |
|---|---|---|
| 0 | No request | |
| 60 to 85 [unit: ° F.] (by 1.0° F.) | Target temperature | |

Remarks

In case ° C. is used in VP, value should be set as ° C.

3.3.2.13. Target Temperature (2nd Left) Command

Request to set target temperature in rear left area

Values

| Value | Description | Remarks |
|---|---|---|
| 0 | | No request |
| 60 to 85 [unit: ° F.] (by 1.0° F.) | | Target temperature |

Remarks

In case ° C. is used in VP, value should be set as ° C.

3.3.2.14. Target Temperature (2nd Right) Command

Request to set target temperature in rear right area

Values

| Value | Description | Remarks |
|---|---|---|
| 0 | | No request |
| 60 to 85 [unit: ° F.] (by 1.0° F.) | | Target temperature |

Remarks

In case ° C. is used in VP, value should be set as ° C.

3.3.2.15. HVAC Fan (1st Row) Command

Request to set fan level of front AC

Values

| Value | Description | Remarks |
|---|---|---|
| 0 | | No request |
| 1 to 7 (Maximum) | | Fan level |

Remarks

If you would like to turn the fan level to 0 (OFF), you should transmit "HVAC (1st row) operation command=OFF."

If you would like to turn the fan level to AUTO, you should transmit "HVAC (1st row) operation command=ON."

3.3.2.16. HVAC Fan (2nd Row) Command

Request to set fan level of rear AC

Values

| Value | Description | Remarks |
|---|---|---|
| 0 | | No request |
| 1 to 7 (Maximum) | | Fan level |

Remarks

If you would like to turn the fan level to 0 (OFF), you should transmit "HVAC (2nd row) operation command=OFF."

If you would like to turn the fan level to AUTO, you should transmit "HVAC (2nd row) operation command=ON."

3.3.2.17. Air Outlet (1st Row) Command

Request to set 1st row air outlet mode

Values

| Value | Description | Remarks |
|---|---|---|
| 0 | No Operation | |
| 1 | UPPER | Air flows to upper body |
| 2 | U/F | Air flows to upper body and feet |
| 3 | FEET | Air flows to feet |
| 4 | F/D | Air flows to feet and windshield defogger |

Remarks

N/A 3.3.2.18. Air Outlet (2nd Row) Command

Request to set 2nd row air outlet mode

Values

| Value | Description | Remarks |
|---|---|---|
| 0 | No Operation | |
| 1 | UPPER | Air flows to upper body |
| 2 | U/F | Air flows to the upper body and feet |
| 3 | FEET | Air flows to feet. |

Remarks

N/A 3.3.2.19. Air Recirculation Command

Request to set air recirculation mode

Values

| Value | Description | Remarks |
|---|---|---|
| 0 | No request | |
| 1 | ON | |
| 2 | OFF | |

Remarks

N/A 3.3.2.20. AC Mode Command

Request to set AC mode

Values

| Value | Description | Remarks |
|---|---|---|
| 0 | No request | |
| 1 | ON | |
| 2 | OFF | |

Remarks

N/A 3.3.2.21. Turnsignal Status

Values

| Value | Description | Remarks |
|---|---|---|
| 0 | OFF | |
| 1 | Left | |
| 2 | Right | |
| 3 | Invalid | |

Remarks

N/A 3.3.2.22. Headlight Status

Values

| Value | Description | Remarks |
|---|---|---|
| 0 | OFF | |
| 1 | TAIL | |
| 2 | Lo | |
| 3 | Reserved | |
| 4 | Hi | |
| 5-6 | Reserved | |
| 7 | Invalid | |

Remarks

N/A 3.3.2.23. Hazardlight Status

Values

| Value | Description | Remarks |
|---|---|---|
| 0 | OFF | |
| 1 | Hazard | |
| 2 | Reserved | |
| 3 | Invalid | |

Remarks

N/A 3.3.2.24. Horn Status

Values

| Value | Description | Remarks |
|---|---|---|
| 0 | OFF | |
| 1 | ON | |
| 2 | Reserved | |
| 3 | Invalid | |

Remarks

In the case that 3.3.2.4 the Horn Pattern Command is active, the Horn status is "1" even if there are OFF periods in some patterns.

3.3.2.25. Front Windshield Wiper Status

Values

| Value | Description | Remarks |
|---|---|---|
| 0 | OFF | |
| 1 | Lo | |
| 2 | Hi | |
| 3 | INT | |
| 4-5 | Reserved | |
| 6 | Fail | |
| 7 | Invalid | |

Remarks

N/A 3.3.2.26. Rear Windshield Wiper Status

Values

| Value | Description | Remarks |
|---|---|---|
| 0 | OFF | |
| 1 | Lo | |
| 2 | Reserved | |

-continued

| Value | Description | Remarks |
|---|---|---|
| 3 | INT | |
| 4-5 | Reserved | |
| 6 | Fail | |
| 7 | Invalid | |

Remarks

N/A 3.3.2.27. HVAC (1st Row) Status

Values

| Value | Description | Remarks |
|---|---|---|
| 0 | OFF | |
| 1 | ON | |

Remarks

N/A 3.3.2.28. HVAC (2nd Row) Status

Values

| Value | Description | Remarks |
|---|---|---|
| 0 | OFF | |
| 1 | ON | |

Remarks

N/A 3.3.2.29. Target Temperature (1st Left) Status

Values

| Value | Description | Remarks |
|---|---|---|
| 0 | Lo | Max cold |
| 60 to 85 [unit: ° F.] | Target temperature | |
| 100 | Hi | Max hot |
| FFh | Unknown | |

Remarks

In case ° C. is used in VP, value should be set as ° C.

3.3.2.30. Target Temperature (1st Right) Status

Values

| Value | Description | Remarks |
|---|---|---|
| 0 | Lo | Max cold |
| 60 to 85 [unit: ° F.] | Target temperature | |
| 100 | Hi | Max hot |
| FFh | Unknown | |

Remarks

In case ° C. is used in VP, value should be set as ° C.

3.3.2.31. Target Temperature (2nd Left) Status

Values

| Value | Description | Remarks |
|---|---|---|
| 0 | Lo | Max cold |
| 60 to 85 [unit: ° F.] | Target temperature | |
| 100 | Hi | Max hot |
| FFh | Unknown | |

Remarks

In case ° C. is used in VP, value should be set as ° C.

3.3.2.32. Target Temperature (2nd Right) Status

Values

| Value | Description | Remarks |
|---|---|---|
| 0 | Lo | Max cold |
| 60 to 85 [unit: ° F.] | Target temperature | |
| 100 | Hi | Max hot |
| FFh | Unknown | |

Remarks

In case ° C. is used in VP, value should be set as ° C.

3.3.2.33. HVAC Fan (1st Row) Status

Values

| Value | Description | Remarks |
|---|---|---|
| 0 | OFF | |
| 1 to 7 | Fan Level | |
| 8 | Undefined | |

Remarks

N/A

3.3.2.34. HVAC Fan (2nd Row) Status

Values

| Value | Description | Remarks |
|---|---|---|
| 0 | OFF | |
| 1 to 7 | Fan Level | |
| 8 | Undefined | |

Remarks

N/A

3.3.2.35. Air Outlet (1st Row) Status

Values

| Value | Description | Remarks |
|---|---|---|
| 0 | ALL OFF | |
| 1 | UPPER | Air flows to upper body |
| 2 | U/F | Air flows to upper body and feet |
| 3 | FEET | Air flows to feet. |
| 4 | F/D | Air flows to feet and windshield defogger operates |
| 5 | DEF | Windshield defogger |
| 7 | Undefined | |

Remarks

N/A

3.3.2.36. Air Outlet (2nd Row) Status

Values

| Value | Description | Remarks |
|---|---|---|
| 0 | ALL OFF | |
| 1 | UPPER | Air flows to upper body |
| 2 | U/F | Air flows to upper body and feet |
| 3 | FEET | Air flows to feet. |
| 7 | Undefined | |

Remarks

N/A

3.3.2.37. Air Recirculation Status

Values

| Value | Description | Remarks |
|---|---|---|
| 0 | OFF | |
| 1 | ON | |

Remarks

N/A

3.3.2.38. AC Mode Status

Values

| Value | Description | Remarks |
|---|---|---|
| 0 | OFF | |
| 1 | ON | |

Remarks

N/A

3.3.2.39. Seat Occupancy (1st Right) Status

Values

| Value | Description | Remarks |
|---|---|---|
| 0 | Not occupied | |
| 1 | Occupied | |
| 2 | Undecided | In case of IG OFF or communication disruption to seat sensor |
| 3 | Failed | |

Remarks

When there is luggage on the seat, this signal may be set as "Occupied".

3.3.2.40. Seat Belt (1st Left) Status

Values

| Value | Description | Remarks |
|---|---|---|
| 0 | Buckled | |
| 1 | Unbuckled | |
| 2 | Undetermined | In case where sensor does not work just after IG-ON |
| 3 | Fault of a switch | |

Remarks

N/A

3.3.2.41. Seat Belt (1st Right) Status

Values

| Value | Description | Remarks |
|---|---|---|
| 0 | Buckled | |
| 1 | Unbuckled | |
| 2 | Undetermined | In case where sensor does not work just after IG-ON |
| 3 | Fault of a switch | |

Remarks
    N/A
3.3.2.42. Seat Belt (2nd Left) Status
Values

| Value | Description | Remarks |
|---|---|---|
| 0 | Buckled | |
| 1 | Unbuckled | |
| 2 | Undetermined | In case where sensor does not work just after IG-ON |
| 3 | Reserved | |

Remarks
    cannot detect sensor failure
3.3.2.43. Seat Belt (2nd Right) Status
Values

| Value | Description | Remarks |
|---|---|---|
| 0 | Buckled | |
| 1 | Unbuckled | |
| 2 | Undetermined | In case where sensor does not work just after IG-ON |
| 3 | Reserved | |

Remarks
    cannot detect sensor failure
3.3.2.44. Seat Belt (3rd Left) Status
Values

| Value | Description | Remarks |
|---|---|---|
| 0 | Buckled | |
| 1 | Unbuckled | |
| 2 | Undetermined | In case where sensor does not work just after IG-ON |
| 3 | Reserved | |

Remarks
    cannot detect sensor failure
3.3.2.45. Seat Belt (3rd Center) Status
Values

| Value | Description | Remarks |
|---|---|---|
| 0 | Buckled | |
| 1 | Unbuckled | |
| 2 | Undetermined | In case where sensor does not work just after IG-ON |
| 3 | Reserved | |

Remarks
    cannot detect sensor failure
3.3.2.46. Seat Belt (3rd Right) Status
Values

| Value | Description | Remarks |
|---|---|---|
| 0 | Buckled | |
| 1 | Unbuckled | |
| 2 | Undetermined | In case where sensor does not work just after IG-ON |
| 3 | Reserved | |

Remarks
    cannot detect sensor failure 3.4. APIs for Power Control 3.4.1. API List for Power Control
3.4.1.1. Inputs

TABLE 8

| Input APIs for Power control | | |
|---|---|---|
| Signal Name | Description | Redundancy |
| Power mode command | Command to control the power mode of VP | N/A |

3.4.1.2. Outputs

TABLE 9

| Output APIs for Power control | | |
|---|---|---|
| Signal Name | Description | Redundancy |
| Power mode status | Status of the current power mode of VP | N/A |

3.4.2. Details of Each API for Power Control
3.4.2.1. Power Mode Command
    Request to control power mode
Values

| Value | Description | Remarks |
|---|---|---|
| 0 | No request | |
| 1 | Sleep | Turns OFF the vehicle |
| 2 | Wake | Turns ON VCIB |
| 3 | Reserved | Reserved for data expansion |
| 4 | Reserved | Reserved for data expansion |
| 5 | Reserved | Reserved for data expansion |
| 6 | Drive | Turns ON the vehicle |

Figure 9:
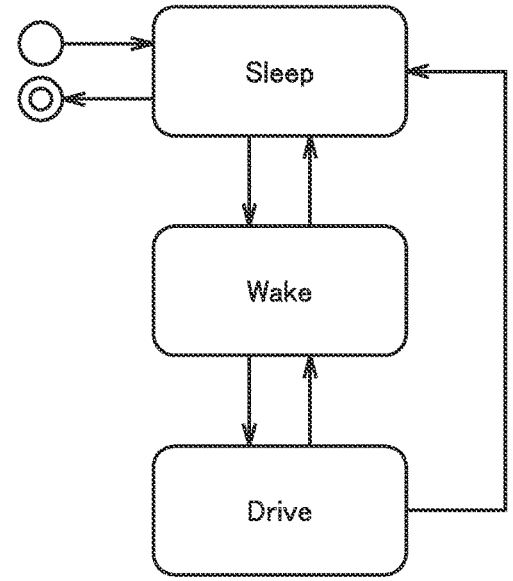
FIG. 9 is a state machine diagram of the power mode.

Remarks
    The state machine diagram of the power modes is shown in FIG. 9.
[Sleep]
    Vehicle power off condition. In this mode, the main battery does not supply power to each system, and neither VCIB nor other VP ECUs are activated.
[Wake]
    VCIB is awake by the auxiliary battery. In this mode, ECUs other than VCIB are not awake except for some of the body electrical ECUs.
[Driving Mode]
    Vehicle power on condition. In this mode, the main battery supplies power to the whole VP and all the VP ECUs including VCIB are awake.
3.4.2.2. Power Mode Status
Values

| Value | Description | Remarks |
|---|---|---|
| 0 | Reserved | |
| 1 | Sleep | |
| 2 | Wake | |
| 3 | Reserved | |
| 4 | Reserved | |

-continued

| Value | Description | Remarks |
|---|---|---|
| 5 | Reserved | |
| 6 | Drive | |
| 7 | Unknown | means unhealthy situation would occur |

Remarks

VCIB will transmit [Sleep] as Power_Mode_Status continuously for 3000 [ms] after executing the sleep sequence. And then, VCIB will shut down.

ADS should stop transmitting signals to VCIB while VCIB is transmitting [Sleep].

3.5. APIs for Failure Notification 3.5.1. API List for Failure Notification 3.5.1.1. Inputs

TABLE 10

| Input APIs for Failure Notification | | |
|---|---|---|
| Signal Name | Description | Redundancy |
| N/A | N/A | N/A |

3.5.1.2. Outputs

TABLE 11

| Output APIs for Failure Notification | | |
|---|---|---|
| Signal Name | Description | Redundancy |
| Request for ADS operation | | Applied |
| Impact detection signal | | N/A |
| Performance deterioration of brake system | | Applied |
| Performance deterioration of propulsion system | | N/A |
| Performance deterioration of shift control system | | N/A |
| Performance deterioration of immobilization system | | Applied |
| Performance deterioration of steering system | | Applied |
| Performance deterioration of power supply system | | Applied |
| Performance deterioration of communication system | | Applied |

3.5.2. Details of Each API for Failure Notification 3.5.2.1. Request for ADS Operation Values

| Value | Description | Remarks |
|---|---|---|
| 0 | No request | |
| 1 | Need maintenance | |
| 2 | Need to be back to garage | |
| 3 | Need to stop immediately | |
| Others | Reserved | |

Remarks

This signal shows a behavior which the ADS is expected to do according to a failure which happened in the VP.

3.5.2.2. Impact Detection Signal

Values

| Value | Description | Remarks |
|---|---|---|
| 0 | Normal | |
| 5 | Crash detection with activated airbag | |
| 6 | Crash detection with shut off high voltage circuit | |
| 7 | Invalid value | |
| Others | Reserved | |

Remarks

When the event of crash detection is generated, the signal is transmitted 50 consecutive times every 100 [ms]. If the crash detection state changes before the signal transmission is completed, the high signal of priority is transmitted.

Priority: crash detection>normal

Transmits for 5 s regardless of ordinary response at crash, because the vehicle breakdown judgment system shall be sent a voltage OFF request for 5 s or less after crash in HV vehicle.

Transmission interval is 100 ms within fuel cutoff motion delay allowance time (1 s) so that data can be transmitted more than 5 times.

In this case, an instantaneous power interruption is taken into account.

3.5.2.3. Performance Deterioration of Brake System

Values

| Value | Description | Remarks |
|---|---|---|
| 0 | Normal | — |
| 1 | Deterioration detected | — |

Remarks

N/A 3.5.2.4. Performance Deterioration of Propulsion System

Values

| Value | Description | Remarks |
|---|---|---|
| 0 | Normal | — |
| 1 | Deterioration detected | — |

Remarks

N/A 3.5.2.5. Performance Deterioration of Shift Control System

Values

| Value | Description | Remarks |
|---|---|---|
| 0 | Normal | — |
| 1 | Deterioration detected | — |

Remarks

N/A

3.5.2.6. Performance Deterioration of Immobilization System

Values

| Value | Description | Remarks |
|---|---|---|
| 0 | Normal | — |
| 1 | Deterioration detected | — |

Remarks

N/A

3.5.2.7. Performance Deterioration of Steering System

Values

| Value | Description | Remarks |
|---|---|---|
| 0 | Normal | — |
| 1 | Deterioration detected | — |

Remarks

N/A

3.5.2.8. Performance Deterioration of Power Supply System

Values

| Value | Description | Remarks |
|---|---|---|
| 0 | Normal | — |
| 1 | Deterioration detected | — |

Remarks

N/A

3.5.2.9. Performance Deterioration of Communication System

Values

| Value | Description | Remarks |
|---|---|---|
| 0 | Normal | — |
| 1 | Deterioration detected | — |

Remarks

N/A

3.6. APIs for Security 3.6.1. API List for Security 3.6.1.1. Inputs

TABLE 12

| Input APIs for Security | | |
|---|---|---|
| Signal Name | Description | Redundancy |
| Door Lock (front) command | Command to control both 1st doors lock | N/A |
| Door Lock (rear) command | Command to control both 2nd doors and trunk lock | N/A |
| Central door lock command | Command to control the all door lock | N/A |
| Device Authentication Signature the 1st word | This is the 8th byte from the 1st byte of the Signature value. | N/A |
| Device Authentication Signature the 2nd word | This is the 16th byte from the 9th byte of the Signature value. | N/A |

TABLE 12-continued

| Input APIs for Security | | |
|---|---|---|
| Signal Name | Description | Redundancy |
| Device Authentication Signature the 3rd word | This is the 24th byte from the 17th byte of the Signature value. | N/A |
| Device Authentication Signature the 4th word | This is the 32th byte from the 25th byte of the Signature value. | N/A |

3.6.1.2. Outputs

TABLE 13

| Output APIs for Security | | |
|---|---|---|
| Signal Name | Description | Redundancy |
| Door lock (1st left) status | Status of the current 1st-left door lock | N/A |
| Door lock (1st right) status | Status of the current 1st-right door lock | N/A |
| Door lock (2nd left) status | Status of the current 2nd-left door lock | N/A |
| Door lock (2nd right) status | Status of the current 2nd-right door lock | N/A |
| Trunk Lock status | Status of the current trunk (back door) lock | N/A |
| Central door lock status | Status of the current all door lock | N/A |
| Alarm system status | Status of the current vehicle alarm | N/A |
| Device Authentication Seed the 1st word | This is the 8th byte from the 1st byte of the Seed value. | N/A |
| Device Authentication Seed the 2nd word | This is the 16th byte from the 9th byte of the Seed value. | N/A |
| Trip Counter | This counter is incremented in units of trips by the Freshness Value management master ECU. | N/A |
| Reset Counter | This counter is incremented periodically by the Freshness Value management master ECU. | N/A |
| 1st Left Door Open Status | Status of the current 1st-left door open/close of the vehicle platform | N/A |
| 1st Right Door Open Status | Status of the current 1st-right door open/close of the vehicle platform | N/A |
| 2nd Left Door Open Status | Status of the current 2nd-left door open/close of the vehicle platform | N/A |
| 2nd Right Door Open Status | Status of the current 2nd-right door open/close of the vehicle platform | N/A |
| Trunk Status | Status of the current trunk door open of the vehicle platform | N/A |
| Hood Open Status | Status of the current hood open/close of the vehicle platform | N/A |

3.6.2. Details of Each API for Security 3.6.2.1. Door Lock (Front) Command, Door Lock (Rear) Command Values

| Value | Description | Remarks |
|---|---|---|
| 0 | No Request | |
| 1 | Lock | Not supported in Toyota VP |
| 2 | Unlock | |
| 3 | Reserved | |

Remarks

If ADK requests for unlocking front side, both front doors are unlocked.

If ADK requests for unlocking rear side, both 2nd row and trunk doors are unlocked.

If ADK requests for locking any door, it should use "Central door lock command."

(The functionality for individual locking is not supported in Toyota VP.)

3.6.2.2. Central Door Lock Command

Request to control all doors' lock

Values

| Value | Description | Remarks |
|---|---|---|
| 0 | No Request | |
| 1 | Lock (all) | |
| 2 | Unlock (all) | |
| 3 | Reserved | |

Remarks

N/A 3.6.2.3. Device Authentication Signature the 1st Word, Device Authentication Signature the 2nd Word, Device Authentication Signature the 3rd Word, Device Authentication Signature the 4th Word, Device Authentication Seed the 1st Word, Device Authentication Seed the 2nd Word Device Authentication Signature the 1st word is presented in from 1st to 8th bytes of the signature.

Device Authentication Signature the 2nd word is presented in from 9th to 16th bytes of the signature.

Device Authentication Signature the 3rd word is presented in from 17th to 24th bytes of the signature.

Device Authentication Signature the 4th word is presented in from 25th to 32nd bytes of the signature.

Device Authentication Seed the 1st word is presented in from 1st to 8th bytes of the seed.

Device Authentication Seed the 2nd word is presented in from 9th to 16th bytes of the seed.

3.6.2.4. Door Lock (1st Left) Status

Values

| Value | Description | Remarks |
|---|---|---|
| 0 | Reserved | |
| 1 | Locked | |
| 2 | Unlocked | |
| 3 | Invalid | |

Remarks

N/A 3.6.2.5. Door Lock (1st Right) Status

Values

| Value | Description | Remarks |
|---|---|---|
| 0 | Reserved | |
| 1 | Locked | |
| 2 | Unlocked | |
| 3 | Invalid | |

Remarks

N/A 3.6.2.6. Door Lock (2nd Left) Status

Values

| Value | Description | Remarks |
|---|---|---|
| 0 | Reserved | |
| 1 | Locked | |

-continued

| Value | Description | Remarks |
|---|---|---|
| 2 | Unlocked | |
| 3 | Invalid | |

Remarks

N/A 3.6.2.7. Door Lock (2nd Right) Status

Values

| Value | Description | Remarks |
|---|---|---|
| 0 | Reserved | |
| 1 | Locked | |
| 2 | Unlocked | |
| 3 | Invalid | |

Remarks

N/A 3.6.2.8. Door Lock Status of all Doors

Values

| Value | Description | Remarks |
|---|---|---|
| 0 | Reserved | |
| 1 | All Locked | |
| 2 | Anything Unlocked | |
| 3 | Invalid | |

Remarks

In case any doors are unlocked, "Anything Unlocked."

In case all doors are locked, "All Locked."

3.6.2.9. Alarm System Status

Values

| Value | Description | Remarks |
|---|---|---|
| 0 | Disarmed | Alarm System is not activated. |
| 1 | Armed | Alarm System is activated without alarming. |
| 2 | Active | Alarm System is activated, and the alarm is beeping. |
| 3 | Invalid | |

Remarks

N/A 3.6.2.9.1. Trip Counter

This counter is incremented in a unit of trips by the Freshness Value management master ECU.

Values

0–FFFFh

Remarks

This value is used to create a Freshness value.

For details, please refer to the other material [the specification of Toyota's MAC module].

3.6.2.9.2. Reset Counter

This counter is incremented periodically by the Freshness Value management master ECU.

Values

0–FFFFFh

Remarks

This value is used to create a Freshness value.

For details, please refer to the other material [the specification of Toyota's MAC module].

3.6.2.10. 1st Left Door Open Status

Status of the current 1st-left door open/close of the vehicle platform

Values

| Value | Description | Remarks |
|-------|-------------|---------|
| 0 | Reserved | |
| 1 | Open | |
| 2 | Closes | |
| 3 | Invalid | |

Remarks

N/A 3.6.2.11. 1st Right Door Open Status

Status of the current 1st-right door open/close

Values

| Value | Description | Remarks |
|-------|-------------|---------|
| 0 | Reserved | |
| 1 | Open | |
| 2 | Close | |
| 3 | Invalid | |

Remarks

N/A 3.6.2.12. 2nd Left Door Open Status

Status of the current 2nd-left door open/close

Values

| Value | Description | Remarks |
|-------|-------------|---------|
| 0 | Reserved | |
| 1 | Open | |
| 2 | Close | |
| 3 | Invalid | |

Remarks

N/A 3.6.2.13. 2nd Right Door Open Status

Status of the current 2nd-right door open/close

Values

| Value | Description | Remarks |
|-------|-------------|---------|
| 0 | Reserved | |
| 1 | Open | |
| 2 | Close | |
| 3 | Invalid | |

Remarks

N/A 3.6.2.14. Trunk Status

Status of the current trunk door open/close

Values

| Value | Description | Remarks |
|-------|-------------|---------|
| 0 | Reserved | |
| 1 | Open | |
| 2 | Close | |
| 3 | Invalid | |

Remarks

N/A 3.6.2.15. Hood Open Status

Status of the current hood open/close

Values

| Value | Description | Remarks |
|-------|-------------|---------|
| 0 | Reserved | |
| 1 | Open | |
| 2 | Close | |
| 3 | Invalid | |

Remarks

N/A

4. API Guides to Control Toyota Vehicles

This section shows in detail the way of using APIs for Toyota vehicles.

4.1. APIs for Vehicle Motion Control 4.1.1. API List for Vehicle Motion Control Input and output APIs for vehicle motion control are shown in Table 14 and Table 15, respectively. Usage guides of some APIs are presented in the following sections as indicated in each table.

4.1.1.1. Inputs

TABLE 14

| Input APIs for Vehicle Motion Control | | | |
|---|---|---|---|
| Signal Name | Description | Redundancy | Usage Guide |
| Propulsion Direction Command | Request for shift change from/to forward (D range) to/from back (R range) | N/A | 4.1.2.1 |
| Immobilization Command | Request for turning on/off WheelLock | Applied | 4.1.2.2 |
| Standstill Command | Request for keeping on/off stationary | Applied | 4.1.2.3 |
| Acceleration Command | Request for acceleration/deceleration | Applied | 4.1.2.1 4.1.2.2 4.1.2.3 4.1.2.4 |
| Front Wheel Steer Angle Command | Request for front wheel steer angle | Applied | 4.1.2.5 |
| Vehicle Mode Command | Request for changing from/ to manual mode to/from Autonomous Mode | Applied | 4.1.2.6 |
| High Dynamics Command | Request for increasing braking response performance* | Applied | — |

*Reaction time in VP upon a request from ADK 4.1.1.2. Outputs

TABLE 15

Output APIs for Vehicle Motion Control

| Signal Name | Description | Redundancy | Usage Guide |
|---|---|---|---|
| Propulsion Direction Status | Current shift status | N/A | — |
| Immobilization Status | Status of immobilization (e.g. EPB and Shift P) | Applied | 4.1.2.2 4.1.2.3 |
| Standstill Status | Standstill status | N/A | 4.1.2.3 |
| Estimated Gliding Acceleration | Estimated vehicle acceleration/deceleration when throttle is fully closed | N/A | — |
| Estimated maximum acceleration | Estimated maximum acceleration | Applied | — |
| Estimated maximum deceleration | Estimated maximum deceleration | Applied | — |
| Front wheel steer angle | Front wheel steer angle | Applied | 4.1.2.5 |
| Front wheel steer angle rate | Front wheel steer angle rate | Applied | — |
| Front wheel steer angle rate limitation | Road wheel angle rate limit | Applied | — |
| Estimated maximum lateral acceleration | Estimated max lateral acceleration | Applied | — |
| Estimated maximum lateral acceleration rate | Estimated max lateral acceleration rate | Applied | — |
| Intervention of accelerator pedal | This signal shows whether the accelerator pedal is depressed by a driver (intervention) | N/A | 4.1.2.4 |
| Intervention of brake pedal | This signal shows whether the brake pedal is depressed by a driver (intervention) | N/A | — |
| Intervention of steering wheel | This signal shows whether the steering wheel is turned by a driver (intervention) | N/A | 4.1.2.5 |
| Intervention of shift lever | This signal shows whether the shift lever is controlled by a driver (intervention) | N/A | — |
| Wheel speed pulse (front left) | Pulse from wheel speed sensor (Front Left Wheel) | N/A | — |
| Wheel rotation direction (front left) | Rotation direction of wheel (Front Left) | N/A | — |
| Wheel speed pulse (front right) | Pulse from wheel speed sensor (Front Right Wheel) | N/A | — |
| Wheel rotation direction (front right) | Rotation direction of wheel (Front Right) | N/A | — |
| Wheel speed pulse (rear left) | Pulse from wheel speed sensor (Rear Left Wheel) | Applied | — |
| Wheel rotation direction (Rear left) | Rotation direction of wheel (Rear Left) | Applied | — |
| Wheel speed pulse (rear right) | Pulse from wheel speed sensor (Rear Right Wheel) | Applied | — |
| Wheel rotation direction (Rear right) | Rotation direction of wheel (Rear Right) | Applied | — |
| Traveling direction | Moving direction of vehicle | Applied | 4.1.2.1 4.1.2.3 |
| Vehicle velocity | Estimated longitudinal velocity of vehicle | Applied | 4.1.2.2 |
| Longitudinal acceleration | Estimated longitudinal acceleration of vehicle | Applied | — |
| Lateral acceleration | Sensor value of lateral acceleration of vehicle | Applied | — |
| Yawrate | Sensor value of Yaw rate | Applied | — |
| Slipping Detection | Detection of tire glide/spin/skid | Applied | — |
| Vehicle mode state | State of whether Autonomous Mode, manual mode or others | Applied | 4.1.2.6 |
| Readiness for autonomization | Situation of whether the vehicle can transition to Autonomous Mode or not | Applied | 4.1.2.6 |
| Failure status of VP functions for Autonomous Mode | This signal is used to show whether VP functions have some failures mode when a vehicle works as Autonomous Mode. | Applied | — |
| PCS Alert Status | Status of PCS (Alert) | N/A | — |
| PCS Preparation Status | Status of PCS (Prefill) | N/A | — |
| PCS Brake/PCS Brake Hold Status | Status of PCS (PB/PBH) | N/A | — |
| ADS/PCS arbitration status | ADS/PCS arbitration status | N/A | — |

4.1.2. API guides in Details for Vehicle Motion Control

4.1.2.1. Propulsion Direction Command

Please refer to 3.2.2.1 for value and remarks in detail.

Figure 10:
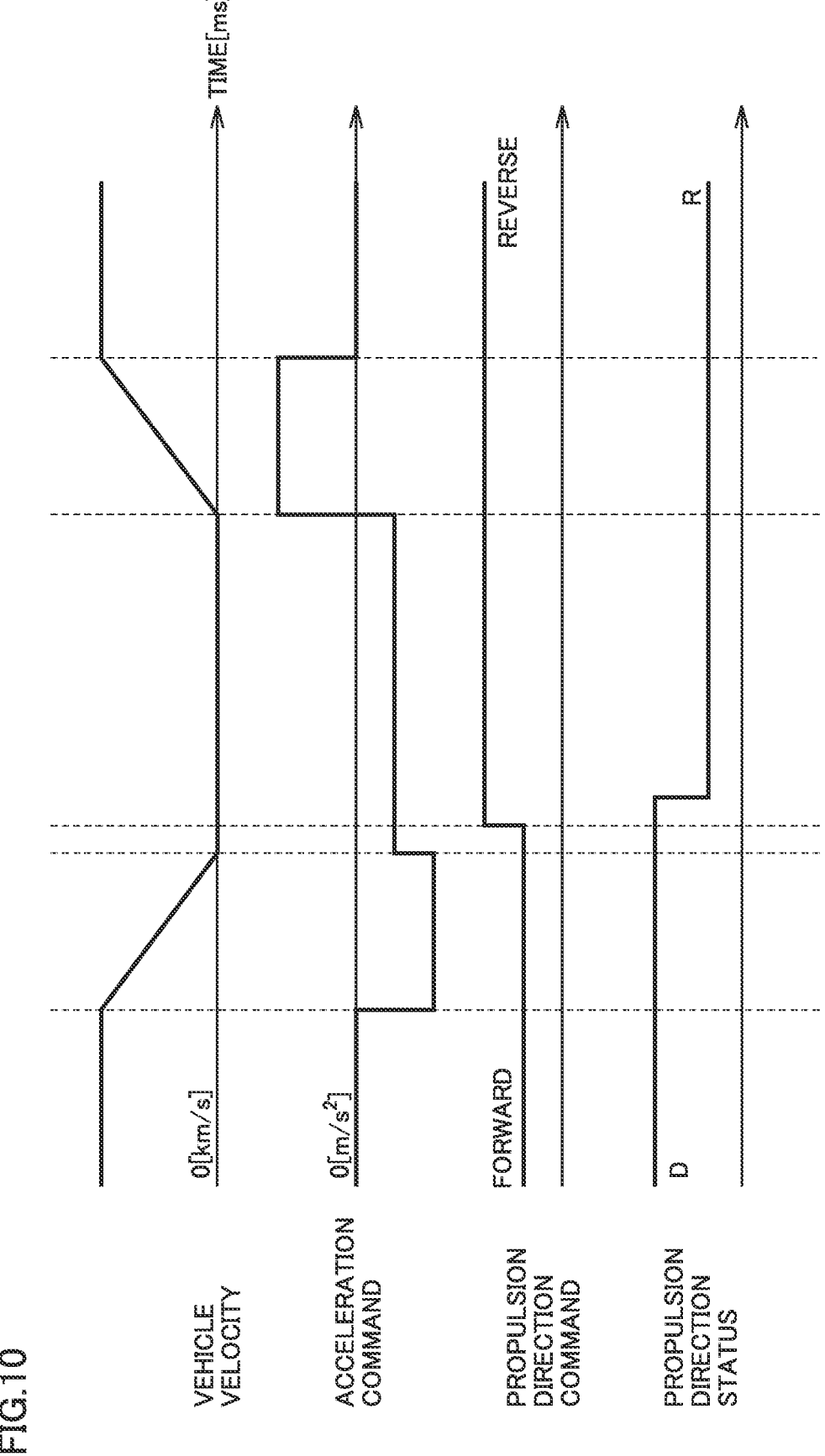
FIG. 10 is a diagram showing details of shift change sequences.

FIG. 10 shows shift change sequences in detail.

First deceleration is requested by Acceleration Command and the vehicle is stopped. When Traveling direction is set to "standstill", any shift position can be requested by Propulsion Direction Command. (In FIG. 10, "D"→"R").

Deceleration has to be requested by Acceleration Command until completing shift change.

After shift position is changed, acceleration/deceleration can be chosen based on Acceleration Command.

While Vehicle mode state=Autonomous Mode, driver's shift lever operation is not accepted.

4.1.2.2. Immobilization Command

Please refer to 3.2.2.2 for value and remarks in detail.

Figure 11:
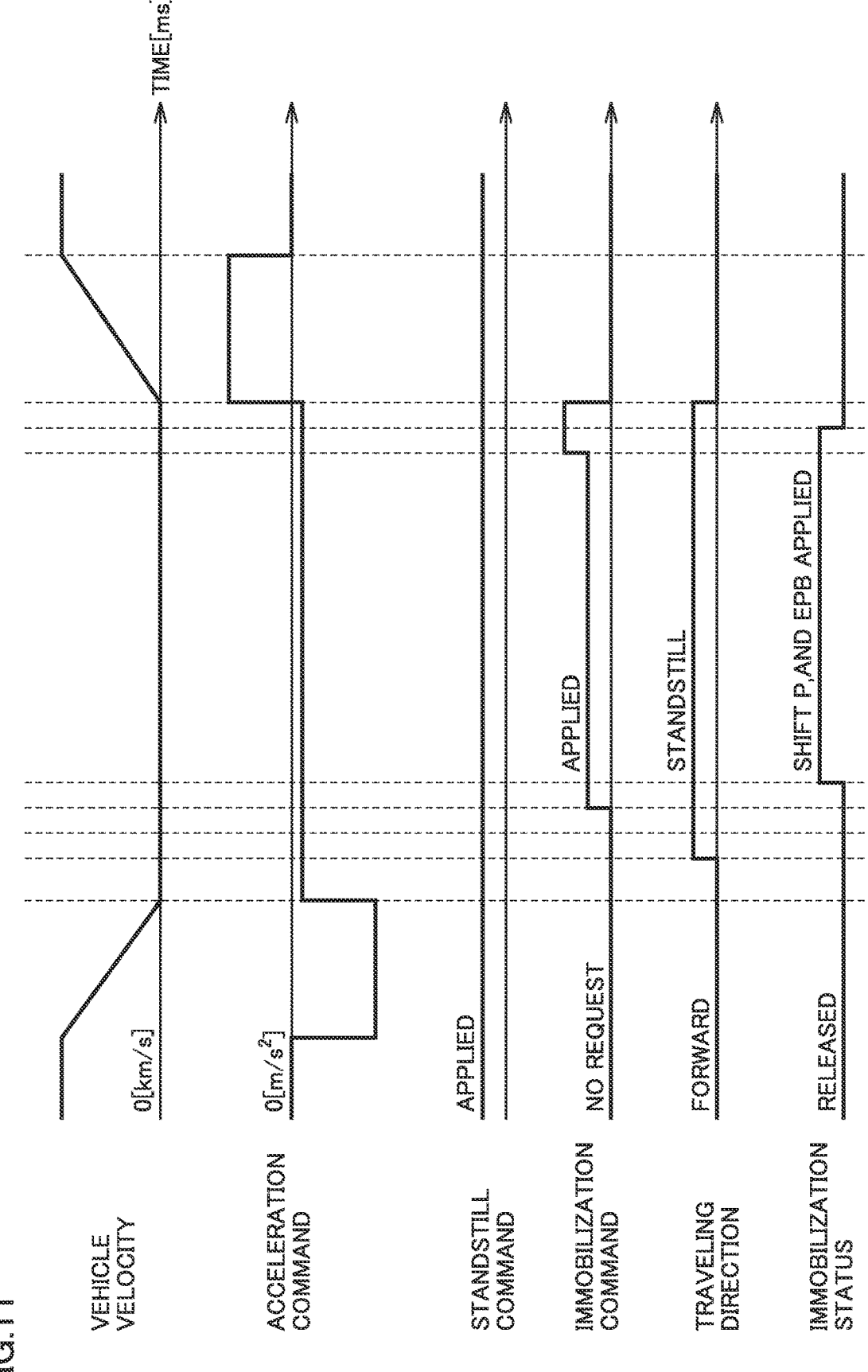
FIG. 11 is a diagram showing immobilization sequences.

FIG. 11 shows how to activate/deactivate immobilization function.

Deceleration is requested with Acceleration Command to make a vehicle stop. When Vehicle velocity goes to zero, Immobilization function is activated by Immobilization Command="Applied". Acceleration Command is set to Deceleration until Immobilization Status is set to "Applied".

When deactivating Immobilization function, Immobilization Command="Released" has to be requested and simultaneously Acceleration Command has to be set as deceleration until confirming Immobilization Status="Released".

After Immobilization function is deactivated, the vehicle can be accelerated/decelerated based on Acceleration Command.

4.1.2.3. Standstill Command

Please refer to 3.2.2.3 for value and remarks in detail.

In case where Standstill Command is set as "Applied", brakehold function can be ready to be used and brakehold function is activated in a condition where a vehicle stops and Acceleration Command is set as Deceleration (<0). And then Standstill Status is changed to "Applied". On the other hand, in case where Standstill Command is set as "Released", brakehold function is deactivated.

Figure 12:
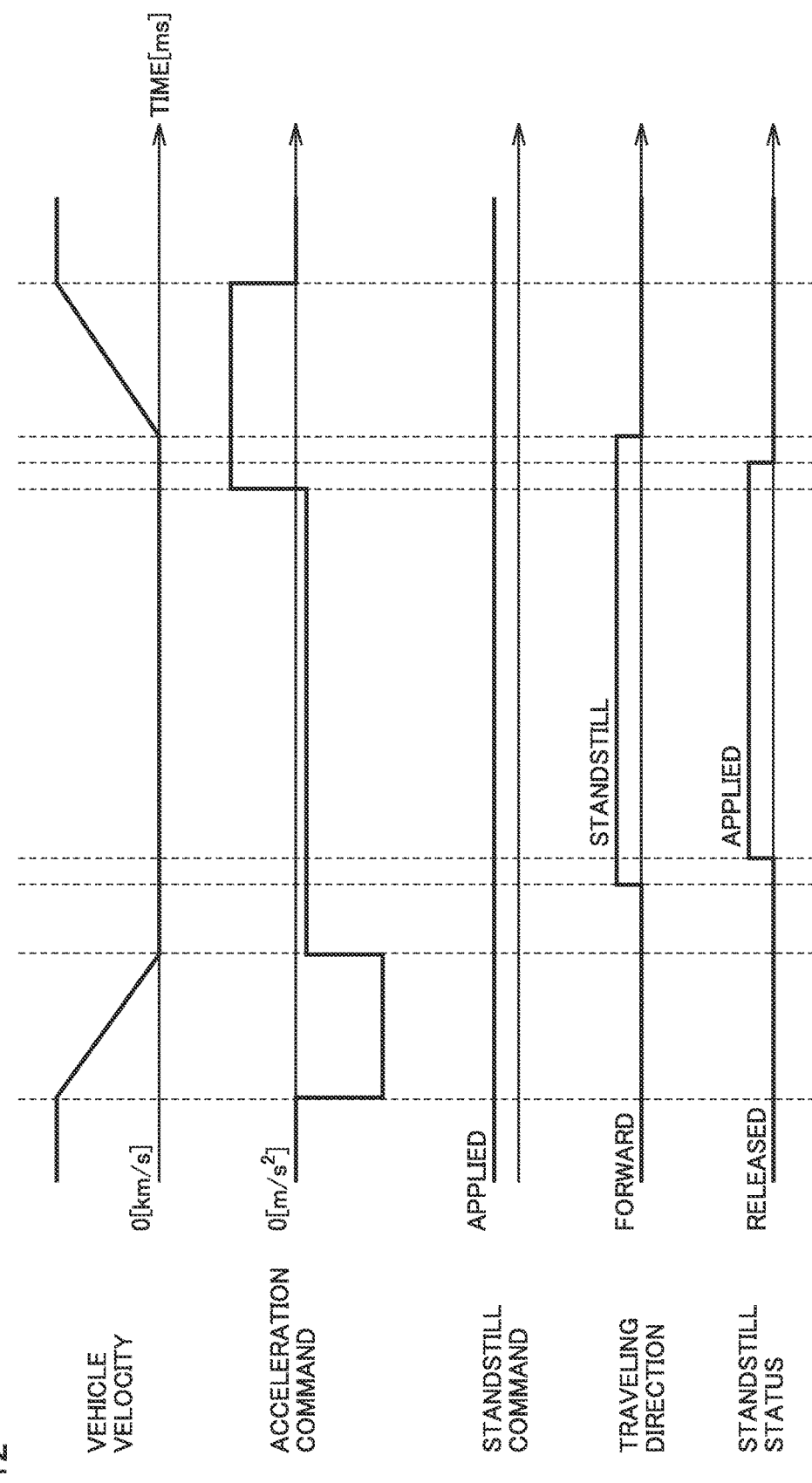
FIG. 12 is a diagram showing standstill sequences.

FIG. 12 shows standstill sequences.

To make a vehicle stop, deceleration is requested with Acceleration Command.

When the vehicle stops for a while, Traveling direction is changed to "standstill". Even during Standstill status="Applied", deceleration shall be requested with Acceleration Command.

If you want the vehicle to move forward, Acceleration Command is set as Acceleration (>0). Then brake hold function is released and the vehicle is accelerated.

4.1.2.4. Acceleration Command

Please refer to 3.2.2.4 for value and remarks in detail.

The below shows how a vehicle behaves when an acceleration pedal is operated.

In case where the accelerator pedal is operated, a maximum acceleration value of either 1) one calculated from accelerator pedal stroke or 2) Acceleration Command input from ADK is chosen. ADK can see which value is selected by checking Intervention of accelerator pedal.

The below shows how a vehicle behaves when a brake pedal is operated.

Deceleration value in the vehicle is the sum of 1) one calculated from the brake pedal stroke and 2) one requested from ADK.

4.1.2.5. Front Wheel Steer Angle Command

Please refer to 3.2.2.5 for value and remarks in detail.

The below shows the way of using Front Wheel Steer Angle Command.

Front Wheel Steer Angle Command is set as a relative value from Front wheel steer angle.

For example, in case where Front wheel steer angle=0.1 [rad] and a vehicle goes straight;

If ADK would like to go straight, Front Wheel Steer Angle Command should be set to 0+0.1=0.1[rad].

If ADK requests to steer by −0.3 [rad], Front Wheel Steer Angle Command should be set to −0.3+0.1=−0.2 [rad].

The below shows how a vehicle behaves when a driver operates the steering.

A maximum value is selected either from 1) one calculated from steering wheel operation by the driver or 2) one requested by ADK.

Note that Front Wheel Steer Angle Command is not accepted if the driver strongly operates the steering wheel. This situation can be found by Intervention of steering wheel flag.

4.1.2.6. Vehicle Mode Command

Figure 13:
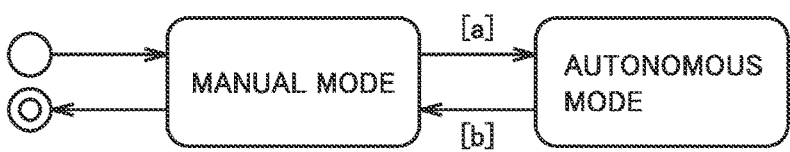
FIG. 13 is a state machine diagram of an autonomy state.

The state machine of mode transition for Autono-MaaS vehicle is shown in FIG. 13.

The explanation of each state is shown as follows.

| State | Description |
|---|---|
| Manual | A vehicle begins with this state and is under a control of a human driver. ADK cannot give any controls (except some commands) to VP. Power mode status and Vehicle mode state are in the followings: Power mode status = Wake or Drive Vehicle mode state = Manual Mode |
| Autonomy | ADK can communicate to VP after authentication is successful. VP is under the control of the ADK as a result of being issued "Request for Autonomy." Power mode status and Vehicle mode state are in the followings: Power mode status = Drive Vehicle mode state = Autonomous Mode |

The explanation of each transition is shown as follows.

| Transition | Conditions |
|---|---|
| a | When the following conditions are established, the mode will be transitioned from Manual to Autonomy: The ADK is authenticated, Power mode status = Drive, Readiness for autonomization = Ready For Autonomy Vehicle Mode Command = Request For Autonomy. |
| b | When the following conditions are established, the mode will be transitioned from Autonomy to Manual: Vehicle Mode Command = Deactivation Request. |

4.2. APIs for BODY Control 4.2.1. API List for BODY Control
4.2.1.1. Inputs

TABLE 16

| | Input APIs for BODY Control | | |
| Signal Name | Description | Redundancy | Usage Guide |
| --- | --- | --- | --- |
| Turnsignal command | Command to control the turnsignallight mode of the vehicle platform | N/A | — |
| Headlight command | Command to control the headlight mode of the vehicle platform | N/A | — |
| Hazardlight command | Command to control the hazardlight mode of the vehicle platform | N/A | — |
| Horn pattern command | Command to control the pattern of horn ON-time and OFF-time per cycle of the vehicle platform | N/A | — |
| Horn cycle command | Command to control the number of horn ON/OFF cycles of the vehicle platform | N/A | — |
| Continuous horn command | Command to control of horn ON of the vehicle platform | N/A | — |
| Front windshield wiper command | Command to control the front windshield wiper of the vehicle platform | N/A | — |
| Rear windshield wiper command | Command to control the rear windshield wiper mode of the vehicle platform | N/A | — |
| HVAC (1st row) operation command | Command to start/stop 1st row air conditioning control | N/A | — |
| HVAC (2nd row) operation command | Command to start/stop 2nd row air conditioning control | N/A | — |
| Target temperature (1st left) command | Command to set the target temperature around front left area | N/A | — |
| Target temperature (1st right) command | Command to set the target temperature around front right area | N/A | — |
| Target temperature (2nd left) command | Command to set the target temperature around rear left area | N/A | — |
| Target temperature (2nd right) command | Command to set the target temperature around rear right area | N/A | — |
| HVAC fan (1st row) command | Command to set the fan level on the front AC | N/A | — |
| HVAC fan (2nd row) command | Command to set the fan level on the rear AC | N/A | — |
| Air outlet (1st row) command | Command to set the mode of 1st row air outlet | N/A | — |
| Air outlet (2nd row) command | Command to set the mode of 2nd row air outlet | N/A | — |
| Air recirculation command | Command to set the air recirculation mode | N/A | — |
| AC mode command | Command to set the AC mode | N/A | — |

4.2.1.2. Outputs

TABLE 17

| | Output APIs for BODY Control | | |
| Signal Name | Description | Redundancy | Usage Guide |
| --- | --- | --- | --- |
| Turnsignal status | Status of the current turnsignallight mode of the vehicle platform | N/A | — |
| Headlight status | Status of the current headlight mode of the vehicle platform | N/A | — |
| Hazardlight status | Status of the current hazardlight mode of the vehicle platform | N/A | — |
| Horn status | Status of the current horn of the vehicle platform | N/A | — |
| Front windshield wiper status | Status of the current front windshield wiper mode of the vehicle platform | N/A | — |
| Rear windshield wiper status | Status of the current rear windshield wiper mode of the vehicle platform | N/A | — |

TABLE 17-continued

Output APIs for BODY Control

| Signal Name | Description | Redundancy | Usage Guide |
|---|---|---|---|
| HVAC (1st row) status | Status of activation of the $1^{st}$ row HVAC | N/A | — |
| HVAC (2nd row) status | Status of activation of the $2^{nd}$ row HVAC | N/A | — |
| Target temperature (1st left) status | Status of set temperature of $1^{st}$ row left | N/A | — |
| Target temperature (1st right) status | Status of set temperature of $1^{st}$ row right | N/A | — |
| Target temperature (2nd left) status | Status of set temperature of $2^{nd}$ row left | N/A | — |
| Target temperature (2nd right) status | Status of set temperature of $2^{nd}$ row right | N/A | — |
| HVAC fan (1st row) status | Status of set fan level of $1^{st}$ row | N/A | — |
| HVAC fan (2nd row) status | Status of set fan level of $2^{nd}$ row | N/A | — |
| Air outlet (1st row) status | Status of mode of 1st row air outlet | N/A | — |
| Air outlet (2nd row) status | Status of mode of 2nd row air outlet | N/A | — |
| Air recirculation status | Status of set air recirculation mode | N/A | — |
| AC mode status | Status of set AC mode | N/A | — |
| Seat occupancy (1st right) status | Seat occupancy status in 1st left seat | N/A | — |
| Seat belt (1st left) status | Status of driver's seat belt buckle switch | N/A | — |
| Seat belt (1st right) status | Status of passenger's seat belt buckle switch | N/A | — |
| Seat belt (2nd left) status | Seat belt buckle switch status in 2nd left seat | N/A | — |
| Seat belt (2nd right) status | Seat belt buckle switch status in 2nd right seat | N/A | — |

4.3. APIs for Power Control

4.3.1. API List for Power Control
4.3.1.1. Inputs

TABLE 18

Input APIs for Power Control

| Signal Name | Description | Redundancy | Usage Guide |
|---|---|---|---|
| Power mode command | Command to control the power mode of VP | N/A | — |

4.3.1.2. Outputs

TABLE 19

Output APIs for Power Control

| Signal Name | Description | Redundancy | Usage Guide |
|---|---|---|---|
| Power mode status | Status of the current power mode of VP | N/A | — |

4.4. APIs for Failure Notification

4.4.1. API List for Failure Notification
4.4.1.1. Inputs

TABLE 20

Input APIs for Failure Notification

| Signal Name | Description | Redundancy | Usage guide |
|---|---|---|---|
| N/A | — | — | — |

4.4.1.2. Outputs

TABLE 21

Output APIs for Failure Notification

| Signal Name | Description | Redundancy | Usage guide |
|---|---|---|---|
| Request for ADS Operation | — | Applied | — |
| Impact detection signal | — | N/A | — |
| Performance deterioration of Brake system | — | Applied | — |
| Performance deterioration of Propulsion system | — | N/A | — |
| Performance deterioration of Shift control system | — | N/A | — |

TABLE 21-continued

| Output APIs for Failure Notification | | | |
| --- | --- | --- | --- |
| Signal Name | Description | Redundancy | Usage guide |
| Performance deterioration of Immobilization system | — | Applied | — |
| Performance deterioration of Steering system | | Applied | — |
| Performance deterioration of Power supply system | | Applied | — |
| Performance deterioration of Communication system | | Applied | — |

4.5. APIs for Security

4.5.1. API List for Security

Input and output APIs for Security are shown in Table 22 and Table 23, respectively. Usage guides of some APIs are presented in the following sections as indicated in each table.

4.5.1.1. Inputs

TABLE 22

| Input APIs for Security | | | |
| --- | --- | --- | --- |
| Signal Name | Description | Redundancy | Usage Guide |
| Door Lock (front) command | Command to control 1st both doors lock | N/A | — |
| Door Lock (rear) command | Command to control 2nd both doors and trunk lock | N/A | — |
| Central door lock command | Command to control the all door lock | N/A | — |
| Device Authentication Signature the 1st word | This is the 8th byte from the 1st byte of the Signature value. | N/A | 4.5.2.1 |
| Device Authentication Signature the 2nd word | This is the 16th byte from the 9th byte of the Signature value. | N/A | 4.5.2.1 |
| Device Authentication Signature the 3rd word | This is the 24th byte from the 17th byte of the Signature value. | N/A | 4.5.2.1 |
| Device Authentication Signature the 4th word | This is the 32th byte from the 25th byte of the Signature value. | N/A | 4.5.2.1 |

4.5.1.2. Outputs

TABLE 23

| Output APIs for Security | | | |
| --- | --- | --- | --- |
| Signal Name | Description | Redundancy | Usage Guide |
| Door lock (1st left) status | Status of the current 1st-left door lock | N/A | — |
| Door lock (1st right) status | Status of the current 1st-right door lock | N/A | — |
| Door lock (2nd left) status | Status of the current 2nd-left door lock | N/A | — |
| Door lock (2nd right) status | Status of the current 2nd-right door lock | N/A | — |
| Central door lock status | Status of the current all door lock | N/A | — |
| Alarm system status | Status of the current vehicle alarm | N/A | — |
| Device Authentication Seed the 1st word | This is the 8th byte from the 1st byte of the Seed value. | N/A | — |
| Device Authentication Seed the 2nd word | This is the 16th byte from the 9th byte of the Seed value. | N/A | — |
| Trip Counter | This counter is incremented in units of trips by the Freshness Value management master ECU. | N/A | — |
| Reset Counter | This counter is incremented periodically by the Freshness Value management master ECU. | N/A | — |
| 1st Left Door Open Status | Status of the current 1st-left door open/close of the vehicle platform | N/A | — |
| 1st Right Door Open Status | Status of the current 1st-right door open/close of the vehicle platform | N/A | — |
| 2nd Left Door Open Status | Status of the current 2nd-left door open/close of the vehicle platform | N/A | — |
| 2nd Right Door Open Status | Status of the current 2nd-right door open/close of the vehicle platform | N/A | — |
| Trunk Status | Status of the current trunk door open of the vehicle platform | N/A | — |
| Hood Open Status | Status of the current hood open/close of the vehicle platform | N/A | — |

65

4.5.2. API Guides in Details for Security
4.5.2.1. Device Authentication Protocol Device authentication is applied when the VCIB is activated from "Sleep" mode.

After the authentication succeeds, the VCIB can start to communicate with ADK.

Figure 14:
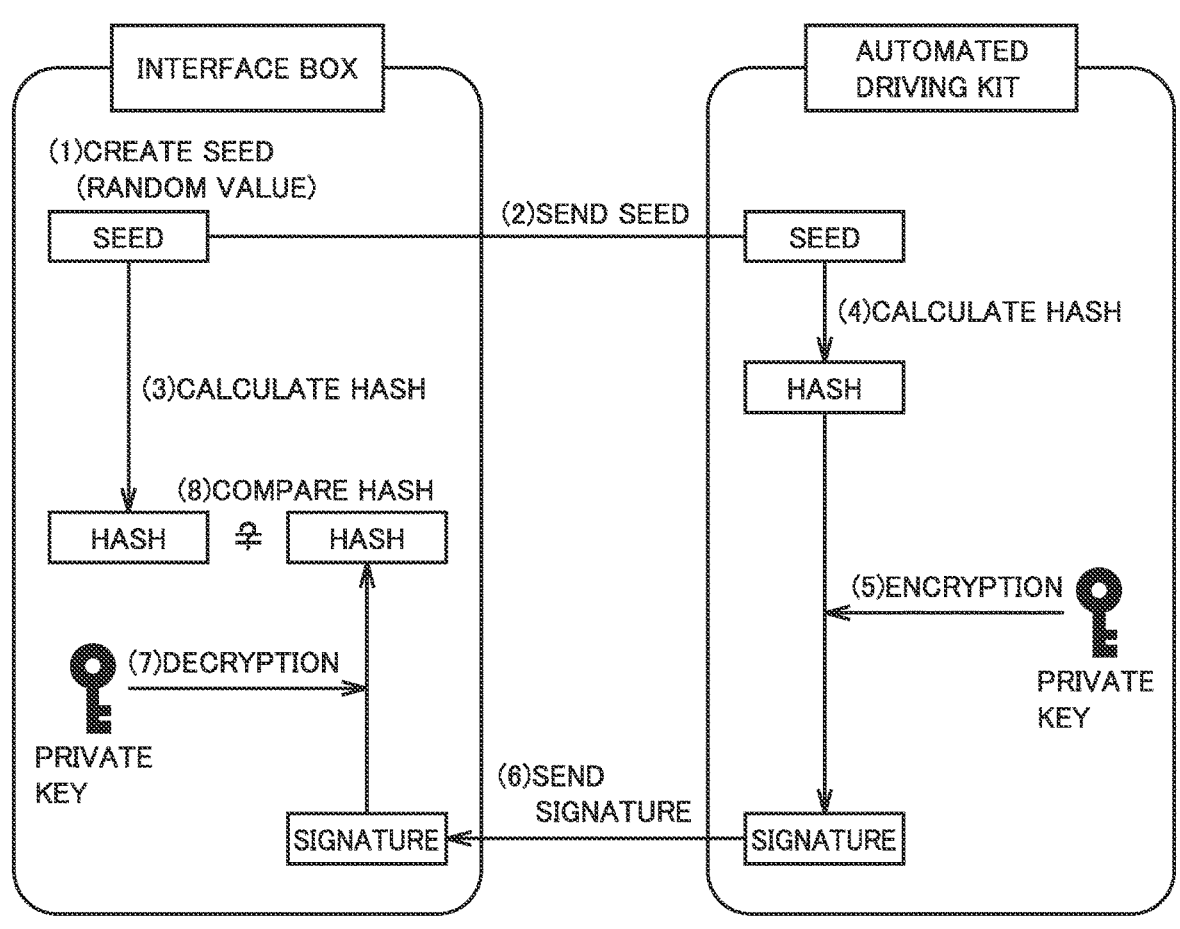
FIG. 14 is a diagram showing an authentication process.

Authentication process is as shown in FIG. 14 Authentication Process.

AUTHENTICATION SPECIFICATION

| Item | Specification | Note |
| --- | --- | --- |
| Encryption algorithms | AES | FIPS 197 |
| Key length | 128 bit | — |
| Block cipher modes of operation | CBC | SP 800-38A |
| Hash algorithms | SHA-256 | FIPS 180-4 |
| Seed length | 128 bit | — |
| Signature length | 256 bit | — |

Though an embodiment of the present disclosure has been described above, it should be understood that the embodiment disclosed herein is illustrative and non-restrictive in every respect. The technical scope in the present disclosure is defined by the terms of the claims and is intended to include any modifications within the scope and meaning equivalent to the terms of the claims.

What is claimed is:

1. A vehicle comprising:
an autonomous driving system; and
a vehicle platform on which the autonomous driving system is mounted, wherein
the vehicle platform includes
a base vehicle that carries out vehicle control in accordance with a command from the autonomous driving system,
a compartment located within the base vehicle configured for a driver, and
a vehicle control interface box that interfaces between the base vehicle and the autonomous driving system,
the base vehicle includes a notification apparatus that is configured to give information to the driver in the compartment, and
when a malfunction occurs in a device in the base vehicle, the vehicle control interface box outputs to the autonomous driving system, at least one of a stop request, an engine off request, a request for change to a parking position, and a request or a notification of maintenance and gives information corresponding to the outputted request or notification by the notification apparatus is provided to the driver in the compartment of the base vehicle, wherein the notification apparatus is a multi-information display that is provided at a position where it can be viewed from where the driver sits in the compartment in a vicinity of a steering wheel of the base vehicle.

2. The vehicle according to claim 1, wherein
the request or the notification of maintenance includes at least one of a request for movement to a dealer of the vehicle, a request for a maintenance service, a request for reservation of the maintenance service, and a notification of a time limit of the maintenance.

3. The vehicle according to claim 1, wherein
the information includes information on at least one of a stop instruction, an instruction to check a manual, an instruction to change to a parking position, an instruction to check a tire of the vehicle, an instruction to turn off power of the vehicle, an instruction to move to a dealer of the vehicle, an instruction to refrain from change to a neutral position, an instruction to remove debris attached to the vehicle, an instruction to clean various sensors, an instruction to operate a brake pedal of the vehicle, and an instruction for replenishment or replacement of various types of hydraulic fluid.

4. The vehicle according to claim 1, wherein
the malfunction of the device in the base vehicle includes at least one of a malfunction of a brake system, a malfunction of a drive system, a malfunction of a power supply system, a malfunction of an operation apparatus, a malfunction of an air bag system, a malfunction of a power steering system, a malfunction of various sensors, a malfunction of a lighting apparatus, and a malfunction of a device that is activated at time of collision.

5. A method of controlling a vehicle, the vehicle including:
a vehicle platform on which an autonomous driving system is mounted, the vehicle platform including:
a base vehicle including a compartment configured for a driver, and
a vehicle control interface box that interfaces between the base vehicle and the autonomous driving system, and
the base vehicle including a notification apparatus that is configured to give information to the driver in the compartment, the method comprising:
carrying out vehicle control in accordance with a command from the autonomous driving system;
outputting to the autonomous driving system, when a malfunction occurs in a device in the base vehicle, at least one of a stop request, an engine off request, a request for change to a parking position, and a request or a notification of maintenance; and
giving information corresponding to the outputted request or notification by the notification apparatus to the driver in the compartment of the base vehicle, wherein the notification apparatus is a multi-information display that is provided at a position where it can be viewed from where the driver sits in the compartment in a vicinity of a steering wheel of the base vehicle.

6. A vehicle control interface box that interfaces between an autonomous driving system and a base vehicle, the base vehicle including a compartment configured for a driver, wherein
the base vehicle carries out vehicle control in accordance with a command from the autonomous driving system,
the base vehicle and the vehicle control interface box implement a vehicle platform provided in the vehicle together with the autonomous driving system,
the base vehicle includes a notification apparatus that is configured to give information to the driver in the compartment, and
when a malfunction occurs in a device in the base vehicle, the vehicle control interface box outputs to the autonomous driving system, at least one of a stop request, an engine off request, a request for change to a parking position, and a request or a notification of maintenance and gives information corresponding to the outputted request or notification by the notification apparatus to the driver in the compartment of the base vehicle, wherein the notification apparatus is a multi-information display that is provided at a position where it can be viewed from where the driver sits in the compartment in a vicinity of a steering wheel of the base vehicle.

* * * * *